US008694396B1

(12) United States Patent
Craner et al.

(10) Patent No.: US 8,694,396 B1
(45) Date of Patent: Apr. 8, 2014

(54) SYSTEMS AND METHODS FOR EPISODIC ADVERTISEMENT TRACKING

(75) Inventors: Michael Craner, Exton, PA (US); Michael Feldman, Newton, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 923 days.

(21) Appl. No.: 12/005,641

(22) Filed: Dec. 26, 2007

(51) Int. Cl.
*H04N 7/10* (2006.01)
*H04N 7/025* (2006.01)
*G06F 3/00* (2006.01)
*G06F 13/00* (2006.01)
*H04N 5/445* (2011.01)
*G06Q 30/00* (2012.01)

(52) U.S. Cl.
USPC ...... 705/32; 705/14.68; 705/14.4; 705/14.25; 705/14.41; 705/14.61; 725/34; 725/36; 725/38; 725/46

(58) Field of Classification Search
None
See application file for complete search history.

(56) References Cited

U.S. PATENT DOCUMENTS

| 5,047,867 | A | | 9/1991 | Strubbe et al. |
|---|---|---|---|---|
| 5,774,170 | A | * | 6/1998 | Hite et al. ............... 725/34 |
| 5,940,073 | A | * | 8/1999 | Klosterman et al. ........ 715/721 |
| 6,002,393 | A | * | 12/1999 | Hite et al. ............... 715/719 |
| 6,005,597 | A | | 12/1999 | Barrett et al. |
| 6,014,184 | A | | 1/2000 | Knee et al. |
| 6,133,912 | A | * | 10/2000 | Montero .................. 715/716 |
| 6,415,437 | B1 | * | 7/2002 | Ludvig et al. ............ 725/41 |
| 6,564,383 | B1 | | 5/2003 | Combs et al. |
| 6,601,041 | B1 | * | 7/2003 | Brown et al. ............ 705/14.61 |
| 6,766,100 | B1 | | 7/2004 | Komar et al. |
| 6,837,789 | B2 | | 1/2005 | Garahi et al. |
| 6,865,746 | B1 | | 3/2005 | Herrington et al. |
| 6,934,964 | B1 | | 8/2005 | Schaffer et al. |
| 6,950,624 | B2 | | 9/2005 | Kim et al. |
| 6,973,621 | B2 | | 12/2005 | Sie et al. |
| 6,987,945 | B2 | * | 1/2006 | Corn et al. .............. 434/350 |
| 7,353,270 | B2 | * | 4/2008 | Kumar et al. ............. 709/224 |
| 7,412,714 | B2 | * | 8/2008 | Kitayama ............... 725/34 |
| 2001/0042128 | A1 | | 11/2001 | Hirayama |
| 2002/0056087 | A1 | | 5/2002 | Berezowski et al. |
| 2002/0111863 | A1 | * | 8/2002 | Landesmann ............ 705/14 |
| 2002/0129368 | A1 | * | 9/2002 | Schlack et al. ........... 725/46 |
| 2002/0133817 | A1 | * | 9/2002 | Markel ................... 725/23 |

(Continued)

FOREIGN PATENT DOCUMENTS

| CN | 1501711 A | 6/2004 |
|---|---|---|
| EP | 1534 014 | 5/2005 |

(Continued)

OTHER PUBLICATIONS

TV Guide Online, TV Guide Spot, http://www.tvguide.com/spot, accessed Apr. 10, 2006.

*Primary Examiner* — Gregory Johnson
(74) *Attorney, Agent, or Firm* — Ropes & Gray LLP

(57) ABSTRACT

Methods and systems for an interactive media guidance application to prevent a user from experiencing an episodic advertisement out of order. Each episodic advertisement includes a plurality of advertisements intended to be viewed in an ordered sequence, and each advertisement of the sequence is part of a story that the episodic advertisement tells. The interactive media guidance application determines whether the user's viewing activity may cause the user to experience a particular advertisement of an episodic advertisement out of order, identifies an alternative advertisement of the episodic advertisement to present in place of the particular advertisement, and presents the alternative advertisement so as to prevent the user from experiencing the particular advertisement out of the ordered sequence of advertisements.

27 Claims, 19 Drawing Sheets

(56) References Cited

U.S. PATENT DOCUMENTS

| | | | |
|---|---|---|---|
| 2002/0144262 A1* | 10/2002 | Plotnick et al. | 725/32 |
| 2003/0061610 A1 | 3/2003 | Errico | |
| 2003/0067554 A1* | 4/2003 | Klarfeld et al. | 348/461 |
| 2003/0093792 A1* | 5/2003 | Labeeb et al. | 725/46 |
| 2003/0149975 A1* | 8/2003 | Eldering et al. | 725/34 |
| 2003/0149980 A1 | 8/2003 | Hassell et al. | |
| 2003/0149988 A1 | 8/2003 | Ellis et al. | |
| 2003/0163541 A1* | 8/2003 | Austin et al. | 709/207 |
| 2003/0167471 A1 | 9/2003 | Roth et al. | |
| 2003/0208763 A1 | 11/2003 | McElhatten et al. | |
| 2004/0098744 A1 | 5/2004 | Gutta | |
| 2004/0111756 A1 | 6/2004 | Stuckman et al. | |
| 2004/0117257 A1* | 6/2004 | Haberman et al. | 705/14 |
| 2004/0193483 A1* | 9/2004 | Wolan | 705/14 |
| 2004/0229568 A1* | 11/2004 | Lowe et al. | 455/66.1 |
| 2004/0237102 A1* | 11/2004 | Konig et al. | 725/36 |
| 2005/0055715 A1 | 3/2005 | Minnick et al. | |
| 2005/0120373 A1 | 6/2005 | Thomas et al. | |
| 2005/0193414 A1 | 9/2005 | Horvitz et al. | |
| 2005/0204388 A1 | 9/2005 | Knudson et al. | |
| 2005/0229213 A1 | 10/2005 | Ellis et al. | |
| 2005/0235316 A1 | 10/2005 | Ahmad | |
| 2005/0240968 A1 | 10/2005 | Knudson et al. | |
| 2005/0251827 A1 | 11/2005 | Ellis et al. | |
| 2005/0265169 A1 | 12/2005 | Yoshimaru et al. | |
| 2005/0273819 A1 | 12/2005 | Knudson et al. | |
| 2006/0031883 A1 | 2/2006 | Ellis et al. | |
| 2006/0117343 A1* | 6/2006 | Novak et al. | 725/38 |
| 2006/0136966 A1 | 6/2006 | Folk | |
| 2006/0140584 A1 | 6/2006 | Ellis et al. | |
| 2007/0050834 A1* | 3/2007 | Royo et al. | 725/119 |
| 2007/0089128 A1* | 4/2007 | Makowski, Jr. et al. | 725/34 |
| 2007/0118848 A1 | 5/2007 | Schwesinger et al. | |
| 2007/0157220 A1* | 7/2007 | Cordray et al. | 725/9 |
| 2008/0028064 A1* | 1/2008 | Goyal et al. | 709/224 |
| 2008/0195468 A1* | 8/2008 | Malik | 705/14 |
| 2008/0270417 A1* | 10/2008 | Roker | 707/10 |
| 2010/0325679 A1 | 12/2010 | Ryal | |

FOREIGN PATENT DOCUMENTS

| | | |
|---|---|---|
| WO | WO 99/65237 | 12/1999 |
| WO | WO 01/84340 | 11/2001 |
| WO | WO 02/07433 | 1/2002 |
| WO | WO 02/42959 | 5/2002 |
| WO | WO 2006/060157 | 6/2006 |

\* cited by examiner

FIG. 2

Lost_S4_E2_Teaser (220) | Uni_ID (222)
- Lost_Tease1 (225)
- Lost_Tease2 (226)
- Lost_Tease3 (227)
- Lost_Tease4 (228)

Jerry_Seinfeld_Amex (210) | Uni_ID (212)
- Jerry_Park (215)
- Jerry_Apt (216)
- Jerry_Street (217)
- Jerry_Party (218)
- Jerry_Subway (219)

| Name | Uni_ID | Seq_ID | Ad-Length | Ad_Active | Ad_Expiration |
|---|---|---|---|---|---|
| Jerry_Park | 367 | 3 | 30 | 1 | 10/12/07 5:00 pm |
| Jerry_Apt | 367 | 4 | 30 | 1 | 10/12/07 5:00 pm |
| Jerry_Street | 367 | 1 | 30 | 1 | 10/12/07 5:00 pm |
| Jerry_Party | 367 | 5 | 30 | 1 | 10/12/07 5:00 pm |
| Jerry_Subway | 367 | 2 | 30 | 1 | 10/12/07 5:00 pm |
| Lost_Tease1 | 394 | 1 | 45 | 0 | 11/29/07 6:00 pm |
| ......... | ......... | ......... | ......... | ......... | ......... |

FIG. 3

| User | Ad_Viewed | Uni_Id | Seq_Id | Time_Viewed |
|---|---|---|---|---|
| Tim | Jerry_Street | 367 | 1 | 10/9/07 5:10 pm |
|  | Jerry_Subway | 367 | 2 | 10/9/07 5:17 pm |
|  | Jerry_Park | 367 | 3 | 10/9/07 5:25 pm |
|  | Jerry_Apt | 367 | 4 | 10/9/07 5:36 pm |
| Eric | Lost_Tease1 | 394 | 1 | 10/11/07 17:20 pm |
|  | Lost_Tease2 | 394 | 2 | 10/11/07 17:28 pm |
|  | Jerry_Street | 394 | 1 | 10/11/07 17:31 pm |
| ...... | ...... | ...... | ...... | ...... |

FIG. 4

SYSTEMS AND METHODS FOR EPISODIC ADVERTISEMENT TRACKING

BACKGROUND OF THE INVENTION

The present invention is directed to approaches for presenting episodic advertisements. Episodic advertisements are advertisements made up by a plurality of advertisements intended to be viewed in an ordered sequence. The entire sequence tells a story, and each advertisement of the sequence is part of the story (i.e., each advertisement of the sequence is an episode within the episodic advertisement). Episodic advertisements may provide a higher level of entertainment than conventional advertisements, and thus spark a high level of interest in the product or service being advertised. One illustrative episodic advertisement chronicled the adventures of Jerry Seinfeld and Superman as they used a particular credit card.

In current viewing environments, a user may experience an episodic advertisement out of order. The user could, for example, begin watching an episodic advertisement in the middle of the ordered sequence. Or, a user could miss viewing an advertisement of the sequence while channel surfing. In each of these situations, the user misses part of the story told by the episodic advertisement. As a result, the episodic advertisement may become less effective in promoting the product or service being advertised.

SUMMARY OF THE INVENTION

Systems and methods are provided for preventing a user from experiencing an episodic advertisement out of order. The episodic advertisement includes a plurality of advertisements intended to be viewed in an ordered sequence, and each advertisement of the sequence is part of the story that the episodic advertisement tells. The episodic advertisements include video, audio, and/or graphics. For purposes of clarity, and not by way of limitation, the present invention may sometimes be described in the context of an interactive media guidance application. It will be understood, however, that the invention may be used in any other suitable type of application, or it may be a stand-alone application.

The interactive media guidance application determines that a user's viewing activity may cause the user to experience an episodic advertisement out of order. This determination may be made, for example, in response to detecting the display of an advertisement, in response to a user input (such as a channel change command), or in response to an advertisement being selected for display on a guidance application display.

In response to the determination, the interactive media guidance application may identify an advertisement to present in place of the particular advertisement that would have caused the user to experience the episodic advertisement out of order. For example, when the interactive media guidance application determines that the user has not viewed any of the advertisements of the episodic advertisement, the selected advertisement may be the first advertisement of the episodic advertisement. Or, the interactive media guidance application may select, based on the last-viewed advertisement of the episodic advertisement, which advertisement the user should be presented next. In embodiments where multiple users are supported, the selection is based on the identified user. Alternatively, household-based viewing patterns may be used.

In some embodiments, the replacement advertisement may be selected from a different episodic advertisement. This may be useful when, for example, the appropriate advertisement of the first episodic advertisement is unavailable.

Once the replacement advertisement is selected, it may be presented to the user so as to prevent the user from experiencing an advertisement of the episodic advertisement out of order. In one embodiment, the subsequent advertisement is provided on a video-on-demand (VOD) or switched digital video (SDV) stream. In another embodiment, advertisements are stored locally on the user's equipment and played back. The interactive media guidance application may determine whether the subsequent advertisement is readily available and present a non-episodic advertisement to the user if the subsequent advertisement is not readily available.

In some embodiments, a startover or lookback mechanism may be available. These mechanisms may be engaged by the media guidance application to facilitate the proper sequencing of episodic advertisements whether or not they are actively or consciously engaged by a user. Startover and lookback are mechanisms that store broadcast programs as aired (including their advertisements) on a video server for playback by a user up to the end of the airing period for the program (startover), and up to a specified number of hours after the airing of the program (lookback). For example, consider the situation where a user views the Nth advertisement of an episodic advertisement on channel A and then tunes (i.e. changes the channel) to channel B, wherein channel B has a program already in progress, that program is available for viewing via startover or lookback, and the program is imminently going to break for a commercial featuring the (N+2)th advertisement of the episodic advertisement. However, viewing channel B would cause the user to miss the (N+1)th advertisement. Assuming that channel B had earlier aired the (N+1)th advertisement, the media guidance application may engage the startover or lookback mechanism to replace the imminent display of the (N+2)th advertisement with the (N+1)th advertisement of the episodic advertisement, thereby maintaining the proper sequencing of the episodic advertisement across tunes. In some embodiments this mechanism is combined with other mechanisms, such as advertisement insertion from the local hard drive, to prevent advertisements being viewed out of their intended sequence.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 2 is an abstract representation of two illustrative episodic advertisements in accordance with one embodiment of the present invention;

FIG. 3 is a diagram of illustrative advertisement metadata in accordance with one embodiment of the present invention;

FIG. 4 is a diagram of illustrative user viewing data in accordance with one embodiment of the present invention;

DETAILED DESCRIPTION

Figure 1:
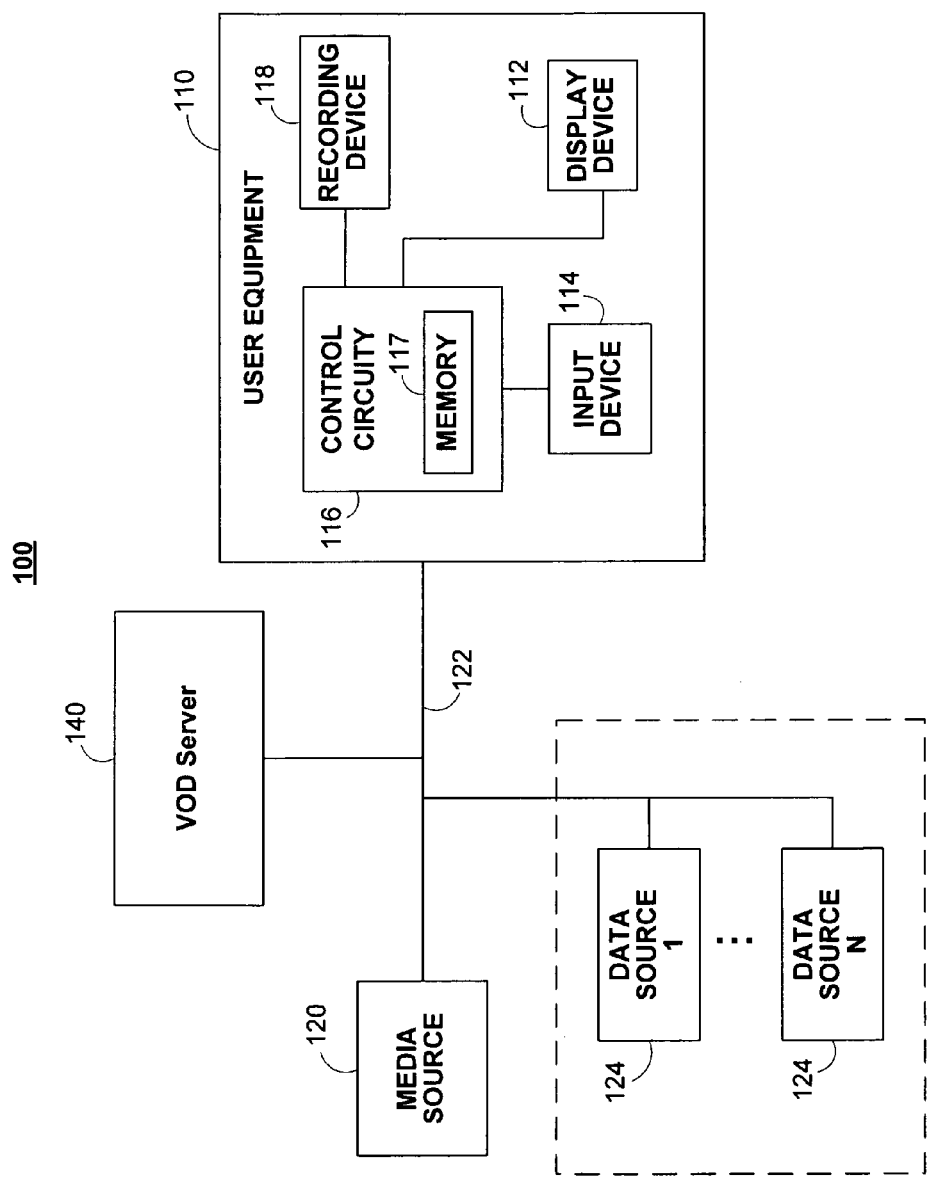
FIG. 1 is a diagram of an illustrative interactive media system in accordance with one embodiment of the present invention.

FIG. 1 shows an illustrative interactive media system 100 in accordance with one embodiment of the invention. User equipment 110 receives media in the form of signals from media source 120 over communications path 122. In practice there may be multiple media sources 120 and user equipment 110, but only one of each has been shown in FIG. 1 to avoid over-complicating the drawing.

Media source 120 may be any suitable media source such as, for example, a cable system headed, satellite media distribution facility, media broadcast facility, internet protocol television (IPTV) head end, on-demand server (e.g., VOD server), website, game service provider (e.g., for online gaming), switched digital video (SDV) system (e.g., comprising SDV manager, edge-resource manager, and edge-QAM sub-systems), startover or lookback manager, or any other suitable facility or system for originating or distributing media. Media source 120 may be configured to transmit signals over any suitable communications path 122 including, for example, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing requests from a trick-play client or an interactive media guidance application implemented in, for example, user equipment 110 or a VOD server.

User equipment 110 may include any equipment suitable for providing an interactive media experience. User equipment 110 may include television equipment such as a television, set-top box, recording device, video player, user input device, or any other device suitable for providing an interactive media experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a home theatre consumer electronic device such as, for example, a gaming system X-Box, PlayStation, or GameCube) or a portable consumer electronic device, such as a portable DVD player, a portable gaming device, a cellular telephone, a PDA, a music player (e.g., MP3 player), or any other suitable home theatre or portable device.

In the example of FIG. 1, user equipment 110 includes at least control circuitry 116, display device 112, and user input device 114 which may be implemented as a separate device or as a single device. User equipment 110 may optionally include recording device 118 which may be implemented as a separate device or as a single, device. An interactive media guidance application may be implemented on user equipment 110 to provide media guidance functions to the user for media displayed on display device 112. In some embodiments, the interactive media guidance application may be or include an interactive television application, a trick-play client, or any other application for providing media features to the user.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of the trick-play client. Display device 112 may also be configured to provide for the output of audio.

User input device 114 may be any suitable device for interfacing with the interactive media guidance application. For example, user input device 114 may be a remote control, keyboard, mouse, touch pad, touch screen or voice recognition interface. User input device 114 may communicate with user equipment 110 and control circuitry 116 using any suitable communications link. For example, user input device 114 may use an infra-red (IR), radio-frequency, Bluetooth, wireless (e.g., 802.11), wired, or any other suitable communications link. The information received by user input device 114 may either be classified as a source selection command or a guidance application navigation command. A source selection command may include a channel change selection, video-on-demand selection, digital-video-recorder selection, or any suitable selection that causes the user to view content different than the content the user is currently viewing. The content the user is currently viewing may be defined as content that is currently being displayed on the display device 112. A guidance application navigation command may include any suitable command that allows the user to change the information displayed in the interactive media guidance application.

Control circuitry 116 is adapted to receive user inputs from input device 114 and execute the instructions of the interactive media guidance application. Control circuitry 116 may include one or more tuners (e.g., analog or digital tuners), encoders and decoders (e.g., MPEG decoders), processors (e.g., Motorola 68000 family processors, or MIPS family processors), memory 117 (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 116 may be included as part of one of the devices of user equipment 110 such as, for example, part of display 112 or any other device (e.g., a set-top box, television and video player). Control circuitry 116 may also include advertisement selection circuitry to prevent the user from experiencing an episodic advertisement out of order. In some embodiments, memory 117 may store user viewing data that includes a user's history of viewing advertisements.

In some embodiments, control circuitry 116 may include a processor (e.g., a microcontroller or microprocessor) that is used to receive and execute interactive media guidance application instructions. These instructions may perform various determinations to ensure that the user is not presented an advertisement of an episodic advertisement out of the correct order. Control circuitry 116 may include memory such as random-access memory for use when executing applications. Nonvolatile memory may also be used to store a boot-up routine or other instructions. In other embodiments, interactive media guidance application instructions may be executed in other suitable stand-alone hardware.

Recording device 118 may be a personal video recorder (PVR), digital video recorder (DVR), video cassette recorder (VCR), DVD-recorder, compact disc recorder, or any other suitable recording device or storage device. In some embodiments, recording device 118 may be a storage device for storing or recording content or data recorded or provided by other components of interactive media system 100 (e.g., a storage device for caching live television programs to enable trick play functions). Recording device 118 may include one or more tuners, and may be configured to cache media as the user receives it with user equipment 110 (e.g., cache the currently tuned channel) to provide trick-play functions for the user. In some embodiments, recording device 118 may include circuitry to determine which advertisements should be recorded using recording device 118.

A hard disk and other storage in recording device 118 may be used to support databases (e.g., a database of media guidance information for recorded programs, or a database of advertisement information for recorded or cached advertisements). A hard disk or other storage in recording device 118 may also be used to record media such as television programs or video-on-demand content or other content provided to recording device 118.

In some embodiments, recording device 118 may include IR communications circuitry or other suitable communications circuitry for communicating with a remote control (e.g., with user input device 114). Recording device 118 may also include dedicated buttons and a front-panel display. The front-panel display may, for example, be used to display the current channel to which the recording device is tuned.

In some embodiments, recording device 118 may be a network recording device that is located outside of user equipment 110. In some embodiments, the network recording device may be incorporated in content source 120 (e.g., at the head-end of a cable plant), data source 124, VOD server 140, user equipment 110 (e.g., as a second recording device, or a hard drive on a home computer), an Internet server (not shown), or any other suitable device. In some embodiments, the network recording device may be a stand alone device (e.g., a commercial network recording device, or a DVR device in a home or neighborhood network). The network recording device may receive instructions to perform recordings from the interactive media guidance application implemented on any of a plurality of instances of user equipment 110.

In some embodiments, the interactive media guidance application may provide features to the user with a client/server approach. There may be one server, for each instance of user equipment 110, one for multiple instances of user equipment 110, or a single server may serve as a proxy for each instance of user equipment 110.

Any suitable number of users may have equipment, such as user equipment 110, connected to media source 120, data sources 124 and advertisement generator 140. A single user may also have multiple instances of user equipment 110. But for the clarity of the figure, the equipment of only a single user is shown. The equipment of the plurality of users may be connected to media source 120, data sources 124 and advertisement generator 140 using a cable television network, a satellite television network, a local area network (LAN), a wireless network, the Internet (e.g., using a DOCSIS modem), or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for an interactive media guidance application. Another data source 124 may, for example, provide data for another interactive application (e.g., a home shopping application, and real-time data such as sports scores, stock quotes, news data and weather data). In some embodiments, data sources 124 may provide data to the interactive media guidance application using a client/server approach. There may be one server per data source, one for all sources or, in some embodiments, a single server may communicate as a proxy between user equipment 110 and various data sources 124. In such embodiments, data source 124 may include control circuitry for executing the instructions of the online media guidance application.

In some embodiments, data source 124 may provide episodic advertisements (e.g., individual text, graphics and video advertisements that collectively form an episodic advertisement) to the interactive media guidance application. The advertisements may be provided by a dedicated data source, or the advertisements, along with other advertisement metadata, may be provided by one or more data sources. Alternatively, advertisements may be provided in part or in whole by the VOD server, lookback or startover server, or by a switched digital video service or from a combination of these or other sources.

Data source 124 may provide guide data to the interactive media guidance application. In one embodiment, the guide data provided by data source 124 may be periodically downloaded in part (e.g., updated) or in whole to memory 117 of control circuitry 116. The guide data may include program listings, ad presentation schedules, or any other suitable guide data. The guide data may include information defining "advertisement metadata" for particular episodic advertisements. The information may be used to retrieve a substitute advertisement to be presented to the user, e.g., the substitute advertisement may be retrieved and presented to the user so that the user does not view an episodic advertisement out of order, or the substitute advertisement may be retrieved and presented based on the particular user, e.g., the advertisement may be targeted to the particular user based on his profile.

Data source 124 may provide advertisement metadata about the episodic advertisements using any suitable technique. For example, this data may be distributed in conjunction with transmitted episodic advertisements (e.g., incorporated in-band with the episodic advertisements), distributed separately from the transmitted episodic advertisements (e.g., out-of-band in a data stream that accompanies the stream of episodic advertisements), as part of the guidance application data, or by any other suitable distribution means. In such an approach, the interactive media guidance application may process the in-band or out-of-band media, or process the data stream to obtain the data (e.g., extract an identifier, or instructions from a data component within an MPEG-2 transport stream).

"Band" is understood by one skilled in the art to refer to any primary digital or analog conduit for transmission including a channel, stream, tunnel, socket, circuit, virtual circuit, or path whether wired or wireless, switched or dedicated. In-band advertisement metadata would thus be understood to be data that is carried in the same channel, stream, tunnel, socket, etc., as the episodic advertisement for which it is associated. An example of in-band carriage of advertisement metadata in an IP stream would be opening an IP socket between a sending application and a receiving application that is used to carry the advertisement metadata in addition to a primary content stream (e.g., the video stream of the episodic advertisement). An example of out-of-band carriage of episodic advertisement metadata in an MPEG-2 system would be the carriage of the advertisement metadata in a digital stream that is carried on an analog carrier at a first frequency and the carriage of the advertisement itself on a carrier at a second frequency, different from the first. In MPEG-2, a single service transport stream (that may be part of a multiple service transport stream) is composed of multiple components including a primary video component, a primary audio component and then one or more data components. If the episodic advertisement metadata is carried in one of the primary or secondary video, audio, or data streams, it is considered in-band to the service; if not, it is considered out-of-band to it.

In an MPEG-4 system, in-band episodic advertisement metadata may be carried in a separate video object plane. For ATSC digital video, the concept of the analog vertical blanking interval (VBI) has been expanded to include a digital data in-band VBI equivalent. More information can be found in the International Standard for Organization ISO-13818 standard, entitled Information Technology Generic Coding of Moving Pictures and Associated Audio Information, and the Consumer Electronic Association CEA-708B standard, entitled Digital Television (DTV) Closed Captioning, each incorporated herein by reference in its entirety.

The interactive media guidance application may distinguish an advertisement of an episodic advertisement from regular television programming by comparing the advertisement metadata to an episodic advertisement metadata schema. The episodic advertisement metadata schema may define the minimum fields that characterize advertisement metadata for a particular advertisement of an episodic advertisement.

The interactive media guidance application may also obtain advertisement metadata associated with a particular advertisement of an episodic advertisement by monitoring user activity such as, for example, the channel that the user is viewing. The interactive media guidance application, using this information (e.g., channel information) and the current time, may access a database (e.g., guide information in data source 124) that contains advertisement metadata for the channels and programs that are available to the user to obtain the advertisement metadata for a particular advertisement. For example, when the user is viewing an episodic advertisement on channel five, the interactive media guidance application may check the database and, from the guide data associated with channel five, and the time of day, determine which episodic advertisements are scheduled to be displayed and the advertisement metadata associated with those advertisements of particular episodic advertisements (e.g., to identify substitute episodic advertisements to display on channel 5).

In some embodiments, data source 124 may provide advertisement metadata associating an individual advertisement with an episodic advertisement. The advertisement metadata may include any suitable identifiers such as, for example, a name for an advertisement, the advertisement's position in the sequence of the episodic advertisement, the length or duration of an advertisement, an expiration time stamp, or any other suitable identifier.

In some embodiments, interactive media system 100 may include video-on-demand (VOD) server 140. VOD server 140 may provide episodic advertisements to be presented to the user on user equipment 110. User equipment 110 may retrieve an advertisement of an episodic advertisement from VOD server 140 in lieu of receiving the episodic advertisement from data source 124.

User equipment 110 may retrieve an episodic advertisement from VOD server 140 by initiating a VOD session. During the VOD session an advertisement of an episodic advertisement may be requested, the availability the requested advertisement on VOD server 140 may be determined, and if the requested advertisement is available, the length of the advertisement may be examined. The length of the advertisement may be examined to determine whether the advertisement can be presented in the current broadcast on user equipment 110. If the advertisement is not of an appropriate length, VOD server 140 may add or remove data, such as video frames, from the advertisement. Alternatively, the broadcast program can be buffered (e.g., in a local DVR-like buffer) and delayed and played back in greater than real-time to catch up or truncated.

FIG. 1 shows media source 120, data sources 124, and VOD server 140 as separate elements. In practice, their functionality may be combined and provided from a single system at a single facility, or multiple systems at multiple facilities. For example, a separate data source 124 may be associated with each of a plurality of television broadcasters and may provide data that is specific to those broadcasters (e.g., advertisements for future programming of the broadcasters, or logo data for displaying broadcasters' logos in interactive media guidance application display screens). As another example, data source 124 and VOD server 140 may be combined to provide substitute episodic advertisements when the interactive media guidance application determines that a user will experience an episodic advertisement out of order. As still yet another example, data source 124 and VOD server 140 may be combined to provide substitute episodic advertisements when the interactive media guidance application determines that a user expresses interest in a particular episodic advertisement.

FIG. 2 shows an abstract representation of two illustrative episodic advertisements in accordance with one embodiment of the present invention. Data for episodic advertisement 210 and episodic advertisement 220 may be received by the interactive media guidance application from data source 124 (FIG. 1), VOD server 140 (FIG. 1), or a combination of the two. Episodic advertisement 210 and episodic advertisement 220 may be labeled with titles 211 and 221, and unique IDs 212 and 222. Titles 211 and 221 may be descriptive as to the product being advertised, characters in the episodic advertisement, plotline of the episodic advertisement, or any other suitable subject matter. For example, episodic advertisement 210 may have a title reading "Jerry_Seinfeld_Amex", which indicates an episodic advertisement for the American Express card starring comedian Jerry Seinfeld. Unique IDs 212 and 222 may uniquely identify the episodic advertisement from other episodic advertisements. Unique IDs 212 and 222 may be a string of characters, a number, or any other suitable identifying means. These unique IDs allow the interactive media guidance application to distinguish a particular episodic advertisement from all other locally stored advertisements, e.g., those stored on user equipment 110 (FIG. 1), all remotely stored episodic advertisements, e.g., those available on VOD server 140 (FIG. 1), or any other episodic advertisements accessible to the interactive media guidance application. For example, episodic advertisements 210 and 220 may be locally stored, and have the unique IDs "367" and "394," respectively.

Episodic advertisement 210 and episodic advertisement 220 may contain any number of individual advertisements. In the abstract representation in FIG. 2, episodic advertisement 210 contains 5 advertisements and episodic advertisement 220 contains 4 advertisements. Each individual advertisement within episodic advertisement 210 and episodic advertisement 220 tells part of a linear story. For example, episodic advertisement 210 may tell a story about an adventure of Jerry Seinfeld and Superman in New York City, while episodic advertisement 220 tells the story of an upcoming episode of the television series Lost. In addition, episodic advertisement 210 and episodic advertisement 220 each advertise a particular product or service. For example, episodic advertisement 210 may generally advertise the services of the American Express card, while episodic advertisement 220 may entice the viewer to watch an upcoming episode of the television series Lost.

FIG. 3 is a diagram of illustrative advertisement metadata 300 in accordance with one embodiment of the present invention. Advertisement metadata 300 may be generated at data source 124 (FIG. 1), advertisement generator 140 (FIG. 1), or a combination of both. Advertisement metadata 300 may be stored in memory 117 of control circuitry 116, or in recording device 118 (FIG. 1). Each row of the diagram in FIG. 3 represents the advertisement metadata for a singular advertisement within an episodic advertisement. Each singular advertisement may have a number of metadata fields, where each metadata field conveys a particular piece of information about the advertisement. For example, advertisements 371, 372, 373, 374, 375, and 376 may have a name field 310, an unique ID field 320, a sequence ID field 330, an advertisement length field 340, an active advertisement field 350, and an advertisement expiration field 360. Each metadata field may be a character string, an integer, a Boolean, or any suitable data structure. These metadata fields are illustrative in that an advertisement may include any number of suitable metadata fields, including 1, 2, 5, 10, 15, 20, 50, or more than 50 metadata fields. In addition, advertisement metadata 300 may include metadata for any number of advertisements, including 1, 2 10, 20, 50, 100, 400, or more than 400 advertisements.

Name field 310 may be descriptive as to elements of the story in the particular advertisement, the advertisement's position in the order of the episodic advertisement, or any suitable descriptive subject matter. For example, advertisement 373 is named "Jerry_Street" and depicts a scene of Jerry Seinfeld and Superman talking while walking through the streets of New York city. Unique ID field 320 may be substantially similar to unique IDs 212 and 222 (FIG. 2). Unique ID field 320 may indicate what particular episodic advertisement an advertisement is part of. For example, advertisement 373 has an unique ID of "367", indicating that it is part of episodic advertisement 210 titled "Jerry_Seinfeld_Amex" (FIG. 2). Sequence ID field 330 indicates an advertisement's position in the order of the episodic advertisement indicated by the advertisement's unique. ID field. For example, advertisement 373 has a sequence ID of "1", indicating that it is the first advertisement in the order of advertisements for episodic advertisement "367" (episodic advertisement 210 in FIG. 2). Advertisement length field 340 may indicate the running time of an advertisement. For example, advertisement 373 has an advertisement length field of "30", indicating that it is 30 seconds long. Active advertisement field 350 may indicate whether an advertisement is available to be presented to the user, e.g., readily available in a video or data stream, or available on a user's recording device 118 (FIG. 1). For example, advertisement 373 has an active advertisement field of "1", indicating that it is available to be presented to the user on recording device 118 (FIG. 1) of the user's user equipment. Advertisement expiration field 360 may indicate the time and date that an advertisement will become unavailable to be viewed by a user, e.g., deleted from the user's recording equipment 118 (FIG. 1) or no longer valid (e.g., in the case of an episodic advertisement for a sale which has a specific end date). For example, advertisement 373 may be an advertisement for a sale that has a specific end date of Oct. 12, 2007 at 5 PM. Thus, advertisement 373 has an advertisement expiration field of "10/12/07 5:00 PM", indicating that at 5 PM on Oct. 12, 2007 the advertisement will be deleted from recording device 118 of the user's user equipment.

FIG. 4 shows a diagram of illustrative user viewing data 400 in accordance with one embodiment of the present invention. User viewing data 400 may be collected and stored in memory 117 of control circuitry 116 (FIG. 1). Portions of user viewing data 400 may be generated from advertisement metadata 300 (FIG. 3). Each row of the diagram in FIG. 4 separated by bold lines contains metadata corresponding to particular episodic advertisements viewed by a user. For example, first user 461 has viewed the advertisements named "Jerry_Street", "Jerry_Subway", "Jerry_Park", and "Jerry_Apt", while second user 462 has viewed the advertisements named "Lost_Tease1", "Lost_Tease2", and "Jerry_Street". Each user 461 and 462 may have a user ID field 410, an ad viewed field 420, an unique ID field 430, a sequence ID field 440, and a time viewed field 450. Each metadata field may be a character string, an integer, a Boolean, or any suitable data structure. These metadata fields are illustrative in that a user may include any number of suitable metadata fields, including 1, 2, 5, 10, 15, 20, 50, or more than 50 metadata fields. In addition, user viewing data 400 may include metadata for any number of advertisements, including 1, 2, 10, 20, 50, 100, 400, or more than 400 advertisements.

User ID field 410 may identify a user who is using user equipment 110 (FIG. 1). In some embodiments, the user ID field 410 is determined through a user identification process. For example, first user 461 has been identified through a user identification process as "Tim". Ad viewed field 420 may be substantially similar to name field 310 (FIG. 3). Unique ID field 430 may be substantially similar to unique ID field 320 (FIG. 3). Sequence ID field 440 may be substantially similar to sequence ID field 330 (FIG. 3). Time viewed field 450 may indicate the time that a user viewed an advertisement. In some embodiments, time viewed field 450 may indicate the time at which a user first viewed the advertisement. For example, first user 461 may have first viewed the advertisement named "Jerry_Street" on "10/9/07 5:10 PM", or on 5:10 PM on Oct. 9, 2007. In other embodiments, time viewed field 450 may indicate the last time at which a user viewed the advertisement. For example, first user 461 may have last viewed the advertisement named "Jerry_Street" on 5:10 PM on Oct. 9, 2007. In some embodiments, if an advertisement was only partially viewed, a percent viewed field may be used to indicate what percentage (or amount of time) the advertisement was viewed by a user. This percentage may reflect the portion of time the user has viewed the advertisement compared to the full length of the advertisement. This information may be used to decide whether this advertisement should be presented to the user another time as opposed to presenting a subsequent advertisement of an episodic advertisement sequence.

FIGS. 6-10 show illustrative guidance application displays of advertisements of episodic advertisements, and interfaces for controlling the episodic advertisement options.

Figure 5:
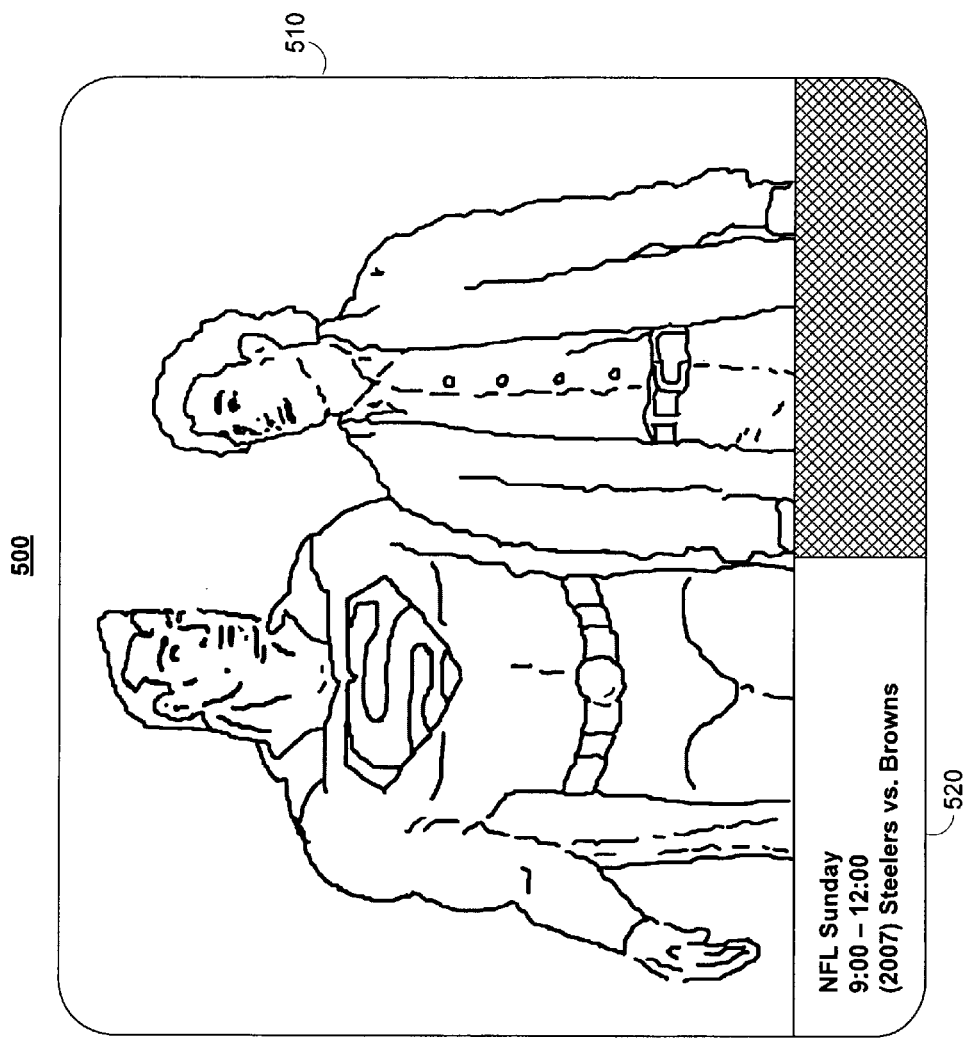
FIG. 5 shows an illustrative display screen showing a first advertisement of an episodic advertisement in accordance with one embodiment of the present invention.

FIG. 5 shows an illustrative display screen 500 showing an initial advertisement of an episodic advertisement in accordance with one embodiment of the present invention. Display screen 500 may include video region 510 in which an advertisement is displayed and guidance application browse window 520. In display screen 500, video region 510 is showing the advertisement "Jerry_Street" (see advertisement 371 in FIG. 3). Guidance application browse window 520 is showing television listings for the current television channel. In one embodiment, when the interactive media guidance application displays advertisement "Jerry Street" in video region 510 control circuitry 116 (FIG. 1) may prevent a user from experiencing this advertisement out of the order specified with its associated episodic advertisement. The interactive media guidance application may make this determination using advertisement metadata and user viewing data, as will be described in FIGS. 11-20. In some embodiments, advertisements that are part of episodic advertisements may provide the option of seeing the next advertisement in the series. For example, the end of the advertisement "Jerry Street" may say, "to see the next episode of Jerry and Superman's adventures, press continue." Upon pressing continue using an input device 114 (FIG. 1), the user may be provided the next advertisement in sequence of the episodic advertisement.

Figure 6:
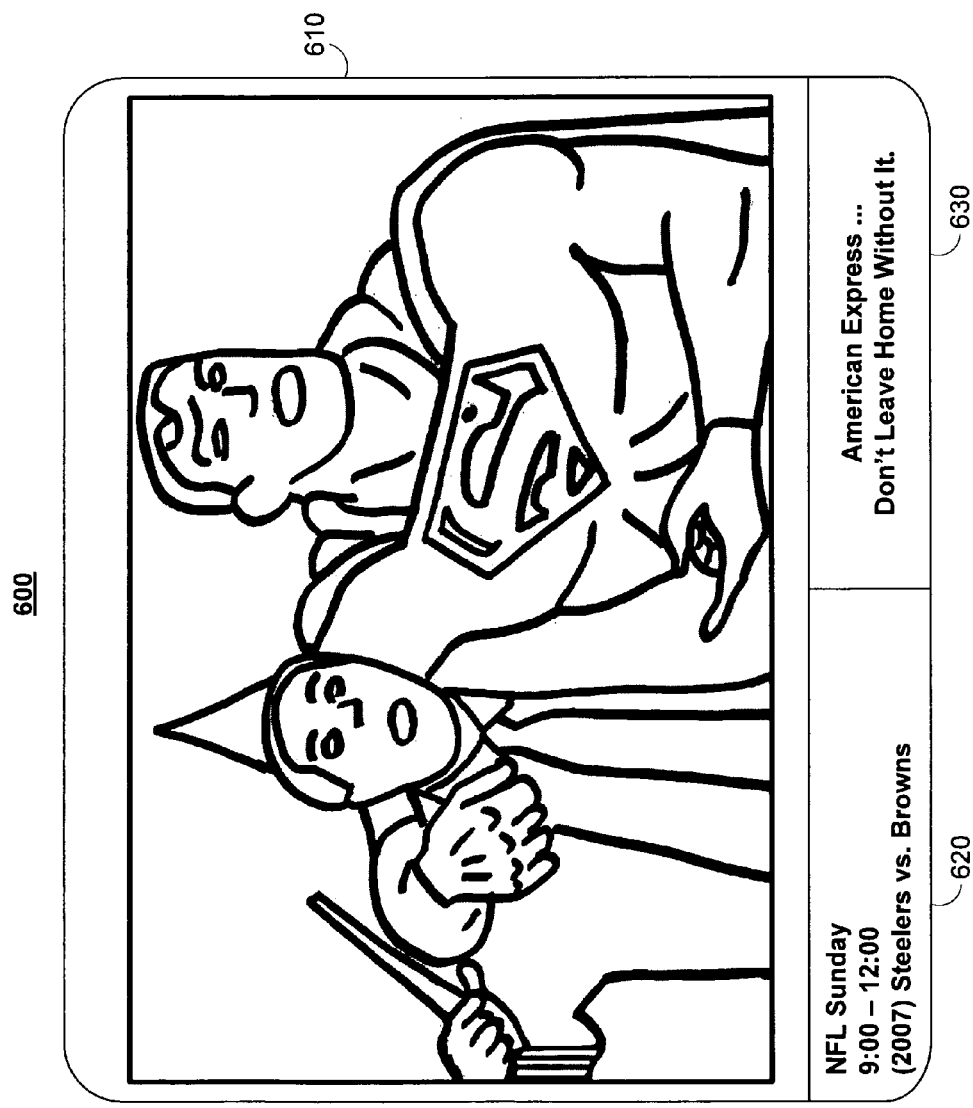
FIG. 6 shows an illustrative display screen showing an advertisement of an episodic advertisement and an accompanying product advertisement in accordance with one embodiment of the present invention.

FIG. 6 shows an illustrative display screen 600 showing a fifth advertisement of an episodic advertisement in accordance with one embodiment of the present invention. Display screen 600 may include video region 610, guidance application browse window 520, and guidance application advertisement window 630. Video region 610 is showing the advertisement "Jerry_Party", which is the fifth advertisement in an episodic advertisement entitled "Jerry_Seinfeld_Amex" (see episodic advertisement 210 in FIG. 2 and advertisement 374 in FIG. 3). Advertisement "Jerry_Party" tells the story of how Jerry Seinfeld used his American Express card to buy refreshments for a party he attends with Superman. Note that in various examples used in this specification, the advertisements used are full screen video advertisements. In practice, episodic advertisements may include advertisements which are partial screen videos, full or partial screen images, animated figures that dance or move or walk and talk and cross the screen, combinations of the aforementioned, or any suitable advertisement form.

In one example, the interactive media guidance application may identify the advertisement "Jerry_Street" 373 (FIG. 3) to present in place of another advertisement that had just been displayed. For example, video region 610 may have just been showing "Jerry_Park" 373, which is the third advertisement in the episodic advertisement "Jerry_Seinfeld_Amex" 210 (FIG. 2) as indicated by unique ID 320 (FIG. 3). The interactive media guidance application may determine that the user watching display screen 600 has already seen the advertisement "Jerry_Park" 373 by examining user viewing data 400 (FIG. 4). Control circuitry 116 may then identify that advertisement "Jerry_Apt" 372 (FIG. 3) is the next advertisement in the episodic advertisement "Jerry_Seinfeld_Amex" 210 that the user should experience. Control circuitry 116 may make this identification by searching advertisement metadata 300 for the episodic advertisement with the same unique ID 320 and a sequence ID 330 (FIG. 3) that is incremented by one compared to the sequence ID of advertisement "Jerry_Park" 373. Thus, control circuitry 116 may present the advertisement "Jerry_Street" to the user in video region 610.

In some embodiments, an additional advertisement related to an episodic advertisement may be displayed in guidance application advertisement window 630. For example, in FIG. 6 an advertisement containing a slogan for the American Express card is being displayed along with an advertisement of the episodic advertisement "Jerry_Seinfeld_Amex".

In one embodiment, a window in the guidance application display may allow the user to indicate interest in an episodic advertisement. The episodic advertisement may be related or unrelated to the content that a user is currently viewing. When a user indicates interest in the episodic advertisement, the interactive media guidance application may present the user with the episodic advertisement (e.g., the next advertisement in the sequence of the episodic advertisement, a series of advertisements from the sequence of the episodic advertisement, or the entire episodic advertisement).

Figure 7:
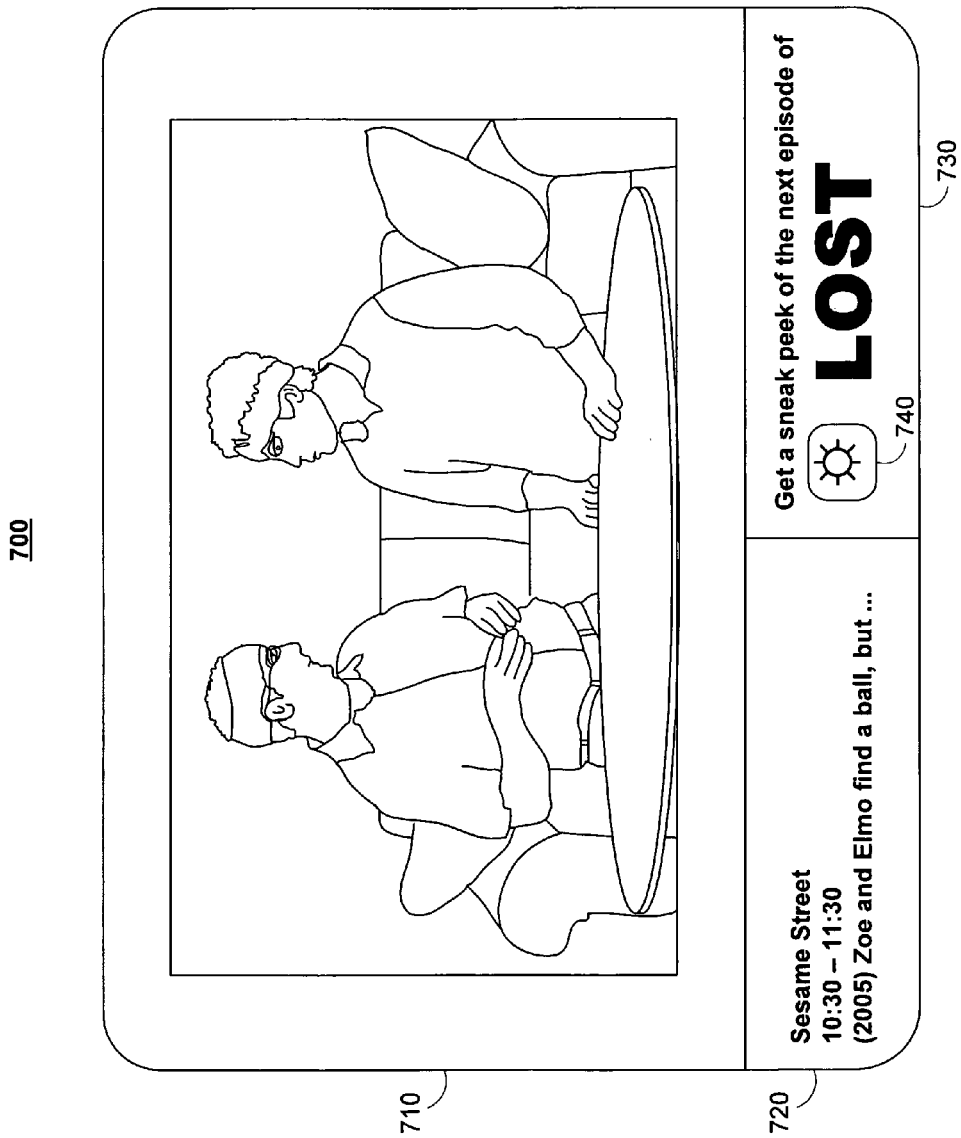
FIG. 7 shows an illustrative display screen in which the viewer indicates interest in an episodic advertisement in accordance with one embodiment of the present invention.

FIG. 7 shows an illustrative display screen 700 in which the viewer indicates an interest in an episodic advertisement in accordance with one embodiment of the present invention. In display screen 700, an episode of the television show "Arrested Development" is playing in video region 710, and listings are provided for television programming in guidance application browse window 720. Display screen 700 also includes guidance application advertisement window 730, which is an advertisement for an upcoming episode of the television show "Lost". The advertisement entices the viewer to watch scenes from the upcoming episode. This particular type of advertisement in guidance application advertisement window 730 may be known as a tickler. Guidance application advertisement window 730 also includes episodic advertisement interest button 740. The user may navigate to and select episodic advertisement interest button 740 using an input device 114 (FIG. 1).

In one embodiment, when a user selects episodic advertisement interest button 740, the interactive media guidance application may present an episodic advertisement to the user associated with the advertisement in guidance application advertisement window 730. For example, in display screen 700 when the user selects episodic advertisement interest button 740, the user will be presented with an episodic advertisement that includes an ordered set of scenes from an upcoming episode of the television show "Lost" (see episodic advertisement 220 in FIG. 2). In one embodiment, the interactive media guidance application presents the episodic advertisement to the user in place of an episodic advertisement already being presented to the user.

Figure 8:
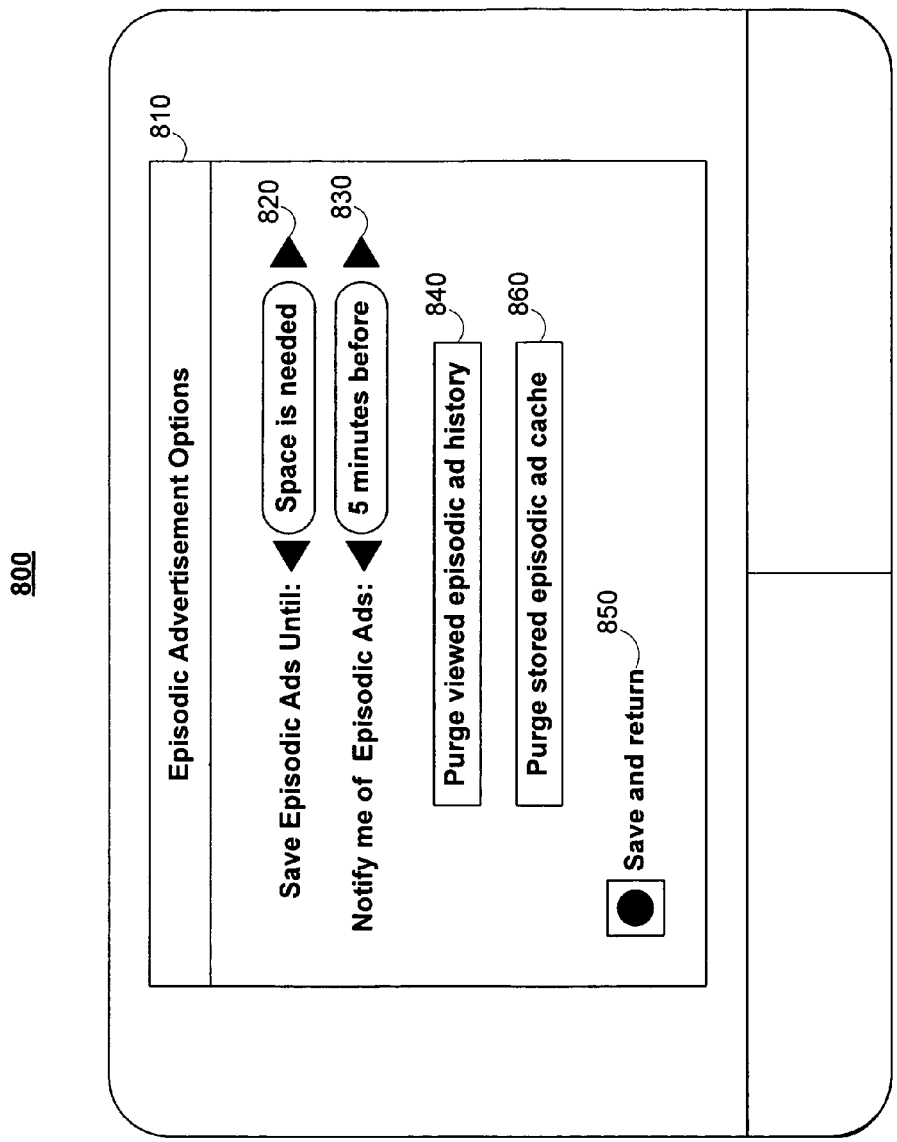
FIG. 8 shows an illustrative display screen showing an interface for adjusting episodic advertisement options in accordance with one embodiment of the present invention.

In one embodiment, the interactive media guidance application may present the user episodic advertisement options for controlling the saving and viewing of episodic advertisements in the interactive media guidance application. FIG. 8 shows an illustrative display screen 800 showing an interface to adjust episodic advertisement options in accordance with one embodiment of the present invention. Display screen 800 includes episodic advertisement options window 810, which the user may navigate to using an input device 114 (FIG. 1). The user may use input device 114 to toggle between various options, and select a particular setting of an option.

In one embodiment, episodic advertisement options window 810 may include episodic advertisement save option 820, which allows a user to adjust how episodic advertisements are saved on his or her recording device 118 (FIG. 1). Episodic advertisement save option 820 may allow a user to specify to the interactive media guidance application that he or she wants to save episodic advertisements on their recording device 118 until space is needed for recording other content, until a specified date, or any other suitable user specified time.

In one embodiment, episodic advertisement options window 810 may include episodic advertisement notification option 830, which allows the user to specify if and when he or she would like to be notified of upcoming episodic advertisements. These notifications may appear in the guidance application advertisement window of the interactive media video region (see guidance application advertisement window 730 of FIG. 7). Episodic advertisement notification option 830 may allow a user to specify to the interactive media guidance application that he or she wants to be notified of episodic advertisements a particular amount of time before they are presented, such as 1, 2 5, 10, 15 more than 15 minutes, or any suitable length of time before the episodic advertisement is displayed. Alternatively, episodic advertisement notification option 830 may allow the user to specify that he or she does not want to be notified of upcoming episodic advertisements at all.

In one embodiment, episodic advertisement options window 810 may include purge ad history button 840, which allows the user to delete their stored history of viewing episodic advertisements. This stored history may be the same as user viewing information 400 (FIG. 4). In one embodiment, when purge ad history button 840 is selected, all user viewing information for a particular user may be deleted. In another embodiment, when purge ad history button 840 is selected all user viewing information for all users is deleted. In this fashion, users may clear their episodic advertisement viewing history so that they may watch particular episodic advertisements again.

In one embodiment, episodic advertisement options window 810 may include purge stored ad button 860, which allows the user to purge all stored advertisements on his or her recording device 118 (FIG. 1). In one embodiment, when a user selects purge stored ad button 860 all stored advertisements on his or her recording device are deleted. In another embodiment, when a user selects purge stored ad button 860 only selected ads are deleted, for example, all of the ads of a particular episodic advertisement or all of the viewed advertisements from one or more episodic advertisements. In this fashion, users may free up more room to store content on their recording device.

Once the user is finished adjusting options in episodic advertisement options window 810, the user may navigate to and select save and return button 850. Save and return button 850 allows the user to save the options he has adjusted and return to what he or she was last viewing in the video region.

Figure 9:
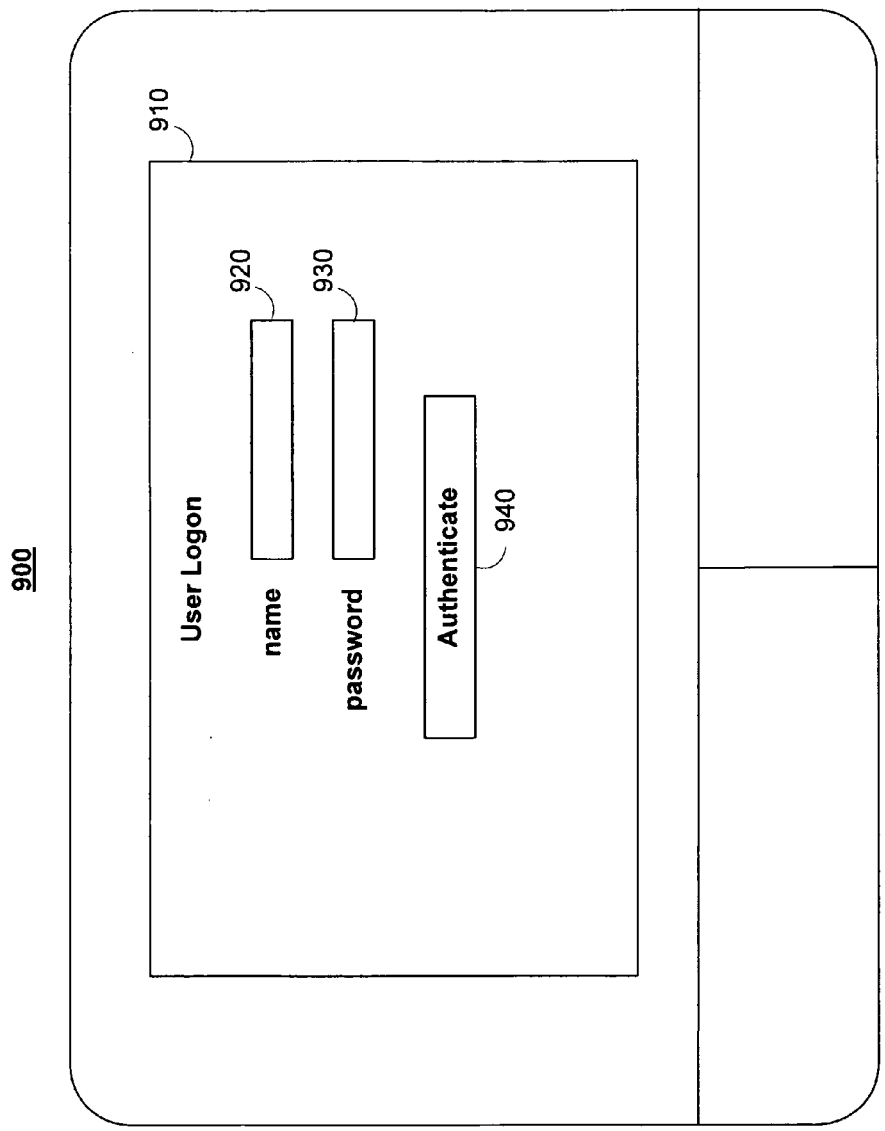
FIG. 9 shows an illustrative display screen showing an interface for identifying a user in accordance with one embodiment of the present invention.

FIG. 9 shows an illustrative display screen 900 showing an interface for identifying a user in accordance with one embodiment of the present invention. Display screen 900 includes user logon interface 910. User logon interface 910 may include name entry box 920 and password entry box 930. The user may enter his or her logon credentials into entry boxes 920 and 930 using input device 114 (FIG. 1), and then navigate to and select authenticate button 940. The interactive media guidance application may then authenticate the user, or prompt the user for further logon credentials.

In one embodiment, once a user has been authenticated through user logon interface 910, the interactive media guidance application may monitor the user's viewing of episodic advertisements. This may allow the interactive media guidance application to build user viewing information similar to user viewing information 400 (FIG. 4), and thus allow the interactive media guidance application to prevent the user from viewing an episodic advertisement out of order.

The following flow charts serve to illustrate processes involved in some embodiments of this invention. The flow charts describe processes primarily in the context of preventing a user from viewing an episodic advertisement out of order. It will be understood that each step in these flow charts may be carried out by the interactive media guidance application by executing instructions on control circuitry 166 (FIG. 1).

Figure 10:
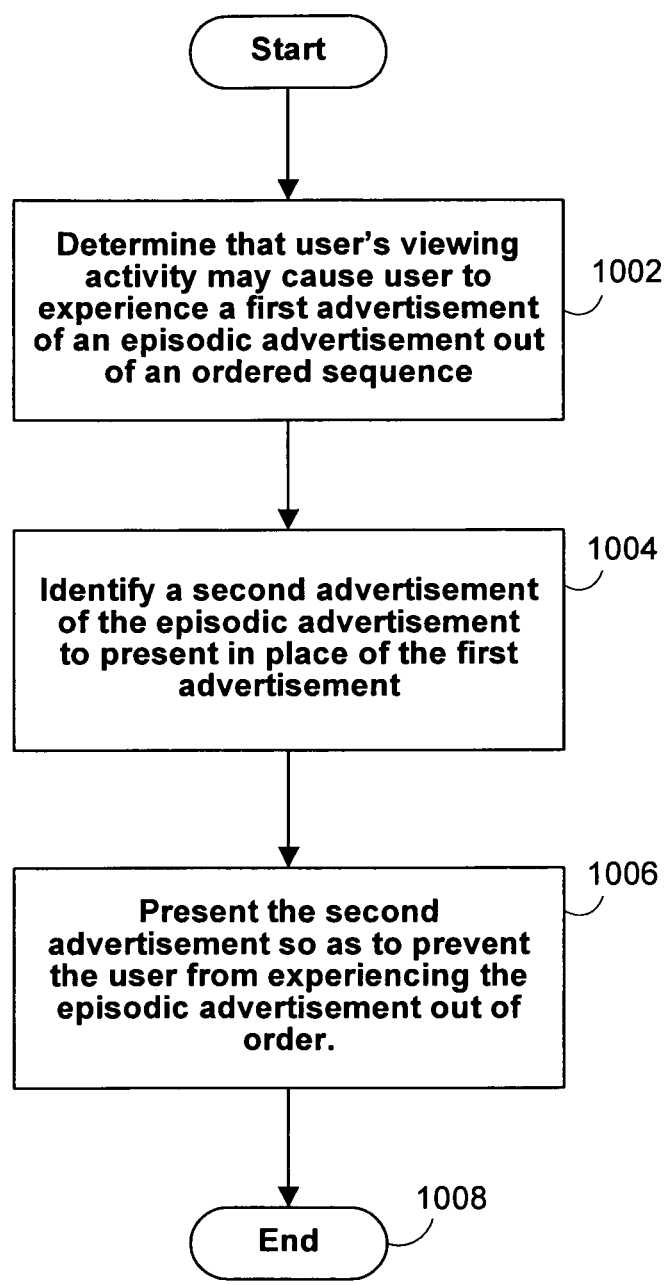
FIG. 10 shows a flow chart of an illustrative process for preventing a user from experiencing an episodic advertisement out of order in accordance with one embodiment of the present invention.

FIG. 10 shows a flow chart of an illustrative process 1000 for preventing a user from experiencing an episodic advertisement out of order in accordance with one embodiment of the present invention. Process 1000 begins at step 1002. At step 1002, the interactive media guidance application determines that a user's viewing activity may cause the user to experience a first advertisement of an episodic advertisement out of the ordered sequence of the episodic advertisement. The interactive media guidance application may perform this determination using advertisement metadata 300 (FIG. 3), user viewing data 400 (FIG. 4), and information from input device 114 (FIG. 1). In particular, the interactive media guidance application may obtain the advertisement metadata for the advertisement that is being displayed in the video region and compare it to the user viewing information for the user currently watching the advertisement. The determination made from the comparison may then be used in step 1004.

In step 1004, a second (i.e., alternative) advertisement of the episodic advertisement is identified to present in place of the first advertisement. In one embodiment, the interactive media guidance application may perform this identification using advertisement metadata 300 (FIG. 3), user viewing data 400 (FIG. 4), and recording device 118 (FIG. 1). In particular, the interactive media guidance application may compare the advertisement metadata and user viewing data to choose the next advertisement or an advertisement of a different episodic advertisement to present in place of the first advertisement. In some embodiments, this may require examining the advertisements stored on user recording device 118.

In step 1006 the second advertisement identified in step 1004 is presented to the user in lieu of the first advertisement. The interactive media guidance application may perform the operations of process 1000 in part making use of advertisement metadata such as advertisement metadata 300 (FIG. 3). In particular, the interactive media guidance application may determine whether the second advertisement is readily available for presentation using active advertisement field 350 (FIG. 3) of the particular advertisement. If the second advertisement is not readily available (e.g. has the value '0'), the interactive media guidance application may wait for the second advertisement to become readily available before presenting the second advertisement. If the second advertisement is readily available (e.g. active advertisement field 350 has the value '1'), the first advertisement may be immediately replaced by the second advertisement. The interactive media guidance application may achieve this immediate replacement with a channel change, a video buffer swap, access to a locally stored copy of the advertisement, initiation of a VOD session with VOD server 140 (FIG. 1) or any other suitable video replacement means. The result is that the first advertisement is not experienced by the user, if it is one that has already been experienced or simply one that is out of the proper viewing sequence for the user based on what the user may have already seen or not seen. In one embodiment, when the second advertisement is not readily available the interactive media guidance application may wait while preventing the user from experiencing the first advertisement. For example, the interactive media guidance application may wait for the second advertisement to become readily available while presenting non-episodic advertisements. For example, the interactive media guidance application may present non-episodic advertisements while it is waiting, or present alternative content, or display a message such as "one moment please." Once the second advertisement has been presented, process 1000 ends at step 1008. Process 1000 is described in more detail in process 1100 (FIG. 11).

In certain situations, it may not be possible at steps 1004 and 1006 to identify a second advertisement of the episodic advertisement in time to present the second advertisement in place of the first advertisement. In such situations, a second advertisement of the episodic advertisement is identified to be presented to the user after they view the advertisement of the episodic advertisement out of order so as to minimize the impact of the user having viewed the wrong advertisement. For example, if a user inadvertently viewed the third advertisement of an episodic advertisement without having first viewed advertisements one and two of the sequence, he may then be presented with the first and second advertisements before being presented either with the any advertisements subsequent to the third advertisement, or he may then be presented again with the third advertisement, the fourth advertisement, and so on. As another example, the advertisements subsequent to the third advertisement of the sequence will be displayed to the user but interspersed with the missed episodes (one and two) in order.

Figure 11:
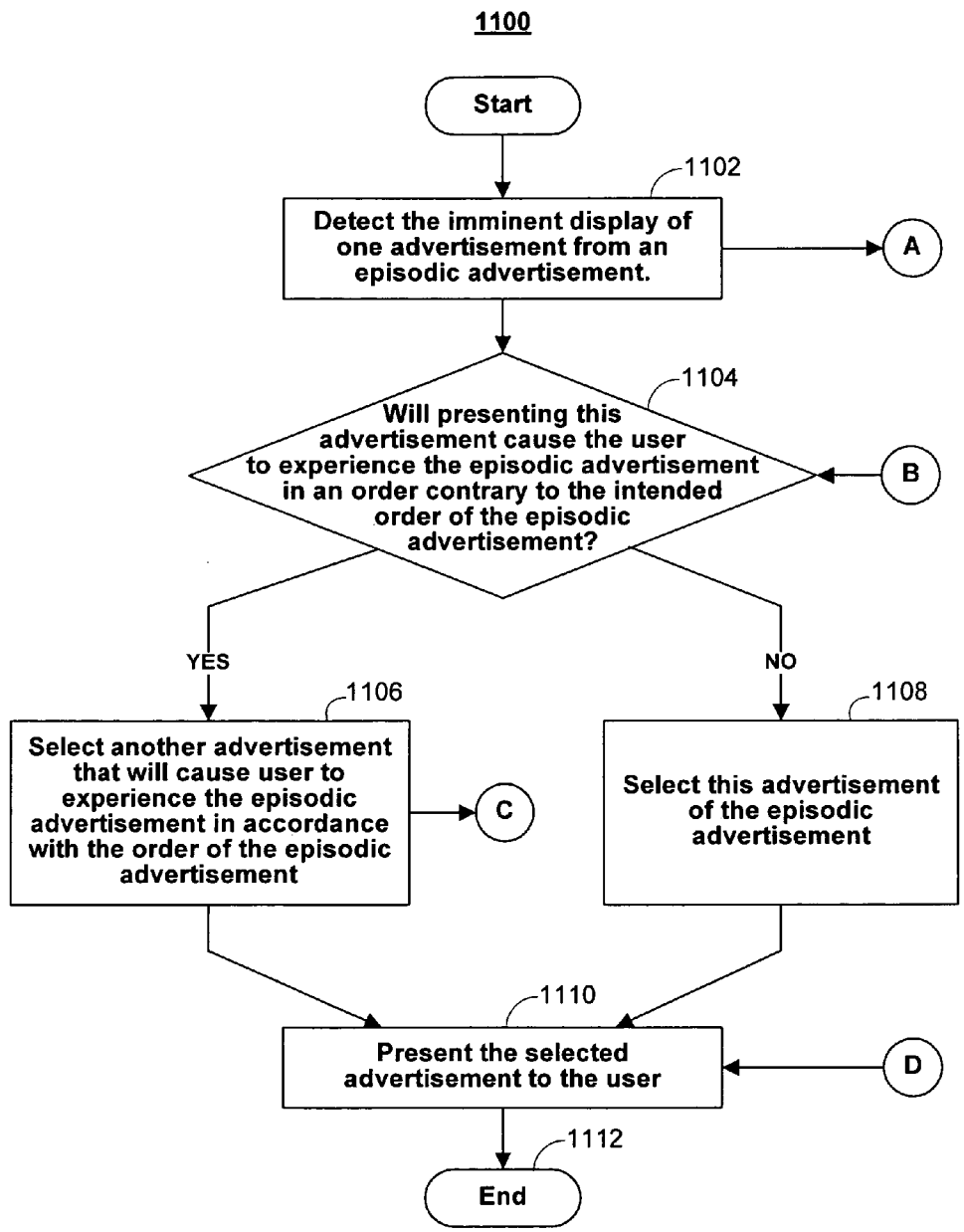
FIG. 11 shows a more detailed view of a flow chart of an illustrative process for preventing a user from experiencing an episodic advertisement out of order in accordance with one embodiment of the present invention.

FIG. 11 shows a more detailed view of a flow chart of an illustrative process 1100 for preventing a user from experiencing an episodic advertisement out of order in accordance with one embodiment of the present invention. Process 1100 may also be used to correct a user's viewing of an episodic advertisement after they have already viewed a particular advertisement in an order contrary to the intended order of the sequence of the episodic advertisement. Process 1100 begins with step 1102. At step 1102, the interactive media guidance application detects the imminent display of an episodic advertisement. Herein, detecting the display of an episodic advertisement may typically refer to detecting the display of a single advertisement of an episodic advertisement. For example, the interactive media guidance application may check incoming media from media source 120 or data source 124 to determine the presence of advertisement metadata. If advertisement metadata is present, the interactive media guidance application may process the advertisement metadata to determine if it has the characteristic metadata fields of an advertisement in an episodic advertisement or a non-episodic advertisement (e.g. standard commercial form). If advertisement metadata is absent, the interactive media guidance application may determine that the media is non-advertisement television programming, or may assume that it is a non-episodic advertisement. The process involved in this step is described in more detail in process 1200, FIG. 12.

In another example, at step 1102 the interactive media guidance application detects the imminent display of an episodic advertisement by monitoring the display of advertisements to the user. The interactive media guidance application may monitor the data encoded in the VBI or side band of broadcast information related to the media displayed in the guidance application display (e.g., inband data) for advertisement metadata. If the advertisement metadata matches that of an episodic advertisement, the interactive media guidance application may determine that an episodic advertisement is about to be displayed.

Once the interactive media guidance application has detected the imminent display of an episodic advertisement, it determines at step 1104 whether presenting the advertisement will cause the user to experience the corresponding episodic advertisement in an order contrary to the intended order of the sequence of the episodic advertisement. For example, the interactive media guidance application may make this determination by searching the advertisement metadata 300 (FIG. 3) of the advertisement and also considering the user's user viewing data 400 (FIG. 4). In one embodiment, the interactive media guidance application may search the user's user viewing data with the unique ID 320 (FIG. 3) of the advertisement. If the unique ID of the advertisement is found in the user's user viewing data, the interactive media guidance application knows that the user has watched an advertisement of the same episodic advertisement in the past. The interactive media guidance application can then examine the sequence ID 330 (FIG. 3) of all advertisements that have the unique ID in the user's user viewing data to determine which advertisement in the episodic advertisement was last viewed by the user. The interactive media guidance application may then compare the sequence ID of the advertisement with the sequence ID of the last advertisement of the episodic advertisement viewed by the user. This allows the interactive media guidance application to know whether presenting the advertisement will cause the viewer to experience the episodic advertisement out of order.

In one example, if the advertisement that will be presented is the third advertisement of an episodic advertisement and the last advertisement of the episodic advertisement viewed by the user is the first advertisement of the episodic advertisement, the interactive media guidance application determines that presenting the third advertisement will cause the user to experience the episodic advertisement out of order. In another example, if the advertisement that will be presented is the third advertisement of an episodic advertisement and the last advertisement of the episodic advertisement viewed by the user is the fourth advertisement of the episodic advertisement, the interactive media guidance application determines that presenting the third advertisement will cause the user to experience the episodic advertisement out of order.

In some embodiments, the interactive media guidance application may compare the sequence ID of the advertisement with the sequence ID of all of the advertisements of the episodic advertisement viewed by the user. This allows the interactive media guidance application to correct a user's viewing of an episodic advertisement after they have already viewed a particular advertisement in an order contrary to the intended order of the sequence of the episodic advertisement. In an example of such an embodiment, if the advertisement that will be presented to the user is the third advertisement of an episodic advertisement and the only other advertisement of the episodic advertisement that has been viewed by the user is the second advertisement of the episodic advertisement, the interactive media guidance application may determine that presenting the third advertisement will cause the user to continue to experience the episodic advertisement out of order.

Figure 13:
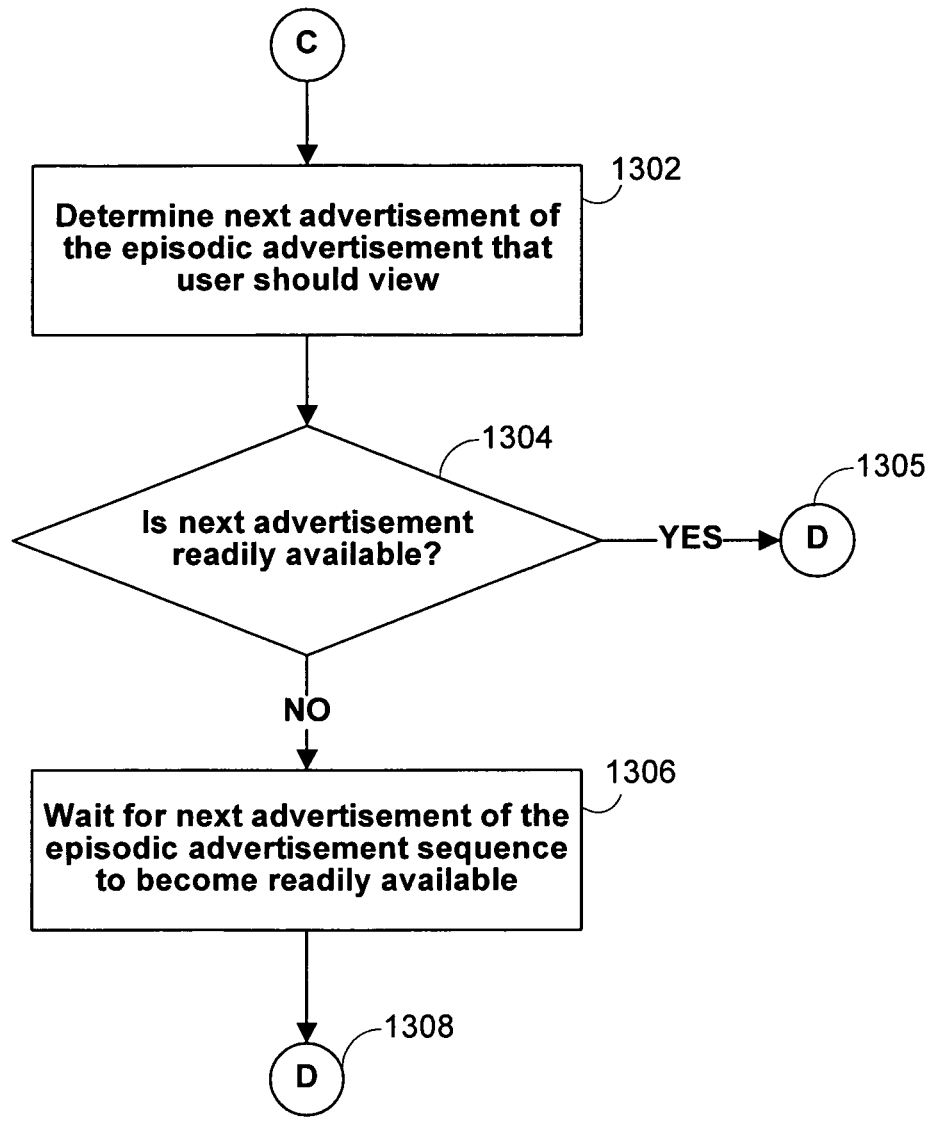
FIG. 13 shows a flow chart of an illustrative process for selecting another advertisement that will cause the user to experience the episodic advertisement in its intended order in accordance with one embodiment of the present invention.

If, at step 1104, the interactive media guidance application determines that presenting the advertisement will cause the user to experience the episodic advertisement in an order contrary to the intended order of the sequence of the episodic advertisement, process 1100 moves to step 1106. At step 1106, another advertisement will be selected that will cause the user to experience the episodic advertisement in accordance with the order of the episodic advertisement. The process involved in this step will be described in more detail in process 1200 (FIG. 13). Once another advertisement has been selected at step 1106, process 1100 moves to step 1110.

If, at step 1104, the interactive media guidance application instead determines that presenting the advertisement will not cause the user to experience the associated episodic advertisement in an order contrary to the intended order of the episodic advertisement, process 1100 moves to step 1108. At step 1108, the advertisement of the episodic advertisement is itself selected to be presented to the user, and process 1100 moves on to step 1110.

At step 1110, the selected advertisement is presented to the user. In particular, the active advertisement field 350 (FIG. 3) may be examined to determine if the advertisement is readily available to be presented. This use of active advertisement field 350 may be substantially similar to that described in step 1006. Process 1100 then ends at step 1112.

Figure 12:
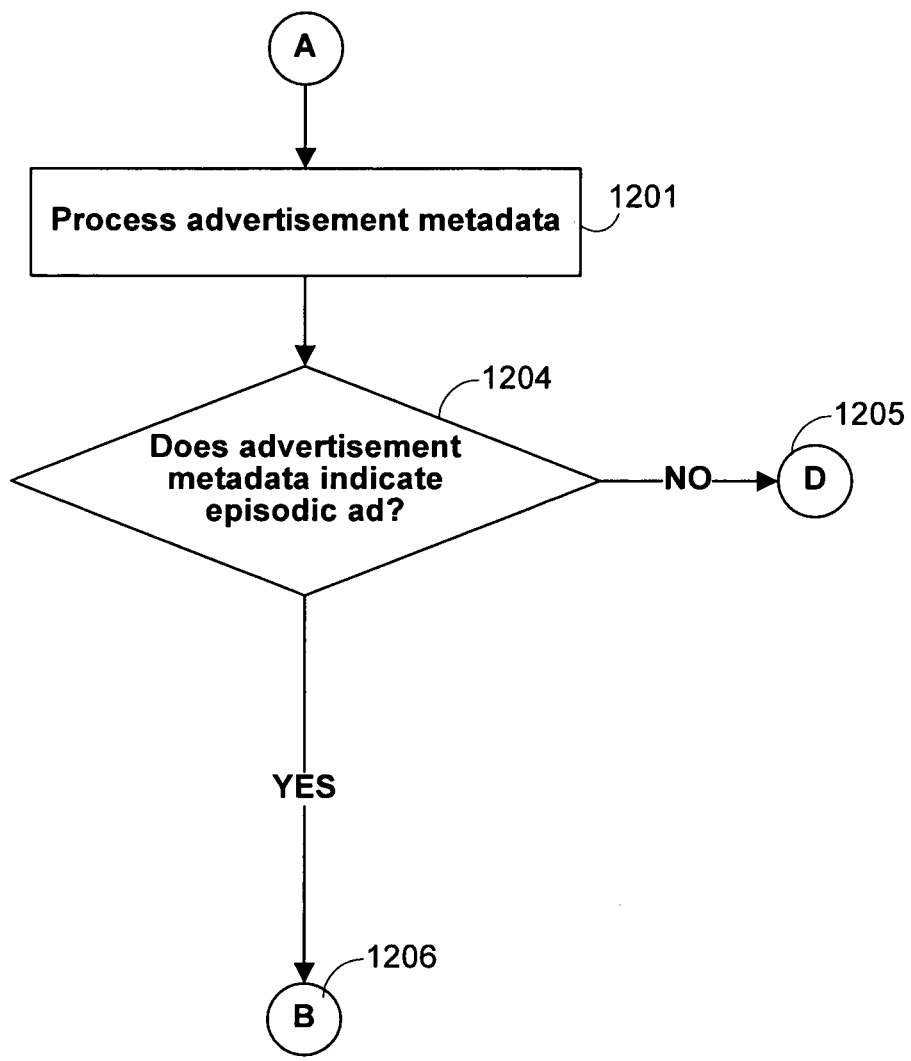
FIG. 12 shows a flow chart of an illustrative process for detecting the display of an advertisement of an episodic advertisement in accordance with one embodiment of the present invention.

FIG. 12 shows a flow chart of an illustrative process 1200 for detecting the display of an advertisement in an episodic advertisement in accordance with one embodiment of the present invention. Process 1200 begins at step 1201. At step 1201, advertisement metadata is processed. This advertisement metadata may be related to an advertisement of the episodic advertisement that will be displayed in the guidance application display in the future, or an advertisement of the episodic advertisement that has just begun in the guidance application display. In particular, the interactive media guidance application may receive advertisement metadata that is data encoded in the VBI or side band of broadcast information, data retrieved from a data stream that was recorded with an advertisement previously received and stored, data acquired by tuning to and receiving a data stream containing an advertisement identified from a link or address for a data stream, or any other suitable means for receiving advertisement metadata. The advertisement metadata may then be parsed. In one embodiment, the interactive media guidance application may parse the received metadata into metadata fields, such as those fields described with respect to advertisement metadata 300 (FIG. 4). This parsing may be performed according to a metadata schema stored on the user equipment 110 (FIG. 1), conveyed by data source 124, conveyed by advertisement generator 140, or any other suitable data source. The metadata schema may specify the particular metadata fields expected in the received advertisement metadata.

At step 1204, the parsed metadata is used to determine whether the advertisement is an episodic advertisement. In one embodiment, this determination may be made on how closely the parsed metadata matches an episodic advertisement metadata schema. The episodic advertisement metadata schema may define the minimum metadata fields necessary to prevent a user from experiencing an episodic advertisement out of order. In one embodiment, the episodic advertisement metadata schema may define the fields 310, 320, 330, 340, 350, and 360 detailed in advertisement metadata 300 (FIG. 3). If the necessary metadata fields are present in the advertisement metadata, the advertisement may be determined to be an advertisement of an episodic advertisement. Conversely, if the necessary metadata fields are not present in the advertisement metadata, the advertisement may be determined to be a non-episodic advertisement.

If, at step 1204, the advertisement is determined to be an episodic advertisement, process 1200 may end at step 1206. Step 1206 may execute process 1100 at step 1104 (FIG. 11), which determines whether presenting the advertisement of the episodic advertisement will cause the user to experience the episodic advertisement contrary to the sequence of the episodic advertisement. If, at step 1204, the advertisement is determined to be a non-episodic advertisement, process 1200 may end at step 1205. The interactive media guidance application may execute step 1205 by executing process 1100 at step 1110, which will present the non-episodic advertisement to the user.

FIG. 13 shows a flow chart of an illustrative process 1300 for selecting another advertisement that will cause the user to experience the episodic advertisement in its intended order in accordance with one embodiment of the present invention. Process 1300 begins at step 1302. At step 1302, the next advertisement of the episodic advertisement that the user should view is determined. In one embodiment, this determination is performed using advertisement metadata 300 (FIG. 3) and user viewing data 400 (FIG. 4). For example, the user viewing data may be examined to determine the last advertisement of the episodic advertisement the user viewed. In embodiments where the interactive media guidance application is preventing the user from experiencing the episodic advertisement out of order, the next advertisement may be selected as the advertisement with an unique ID matching the last advertisement of the episodic advertisement the user viewed and a sequence ID one value higher than the sequence ID of the last advertisement of the episodic advertisement the user viewed. In embodiments where the interactive media guidance application is correcting the user's viewing of an episodic advertisement after they have already viewed a particular advertisement in an order contrary to the intended order of the sequence of the episodic advertisement, the next advertisement may be selected as the first advertisement of the episodic advertisement, thus causing the user to view the episodic advertisement from the beginning. Alternatively, in such embodiments the next advertisement may be selected as the advertisement with an unique ID matching the last advertisement of the episodic advertisement and a sequence ID one value higher than the sequence ID of the last advertisement of the episodic advertisement the user viewed, thus causing the user to view the episodic advertisement in order from that point on. Once the next advertisement has been determined, process 1300 moves to step 1304.

At step 1304, the interactive media guidance application determines whether the next advertisement is readily available. In one embodiment, this determination may be made using active advertisement field 350 (FIG. 3). The process by which the determination is made may be substantially similar to that described with respect to step 1006 (FIG. 10).

If, at step 1304, it is determined that the next advertisement is not readily available, process 1300 moves to step 1306. At step 1306, the interactive media guidance application may wait for the next advertisement to become readily available. This wait may be performed by polling the active advertisement field 350 (FIG. 3) at a regular interval. During the wait, the interactive media guidance application may attempt to retrieve the next advertisement by initiating a VOD session with VOD server 140 (FIG. 1). When the active advertisement field 350 has a value of '1', interactive media guidance application may then retrieve the next advertisement from the appropriate source. The appropriate source may be VOD server 140, data source 124 (FIG. 1), recording device 118 (FIG. 1) or any other suitable source. While the interactive media guidance application is waiting at step 1306 for the next advertisement to become readily available, non-episodic advertisements may be displayed. The non-episodic advertisements may be from any suitable content source. Once the next advertisement becomes readily available, process 1300 ends at step 1308. Step 1308 may execute step 1110 (FIG. 11), which will present the next advertisement to the user.

If, at step 1304, it is determined that the next advertisement is readily available, process 1300 may end at step 1305. The interactive media guidance application may execute step 1305 by executing step 1201 (FIG. 11), which will present the next advertisement to the user.

Figure 14:
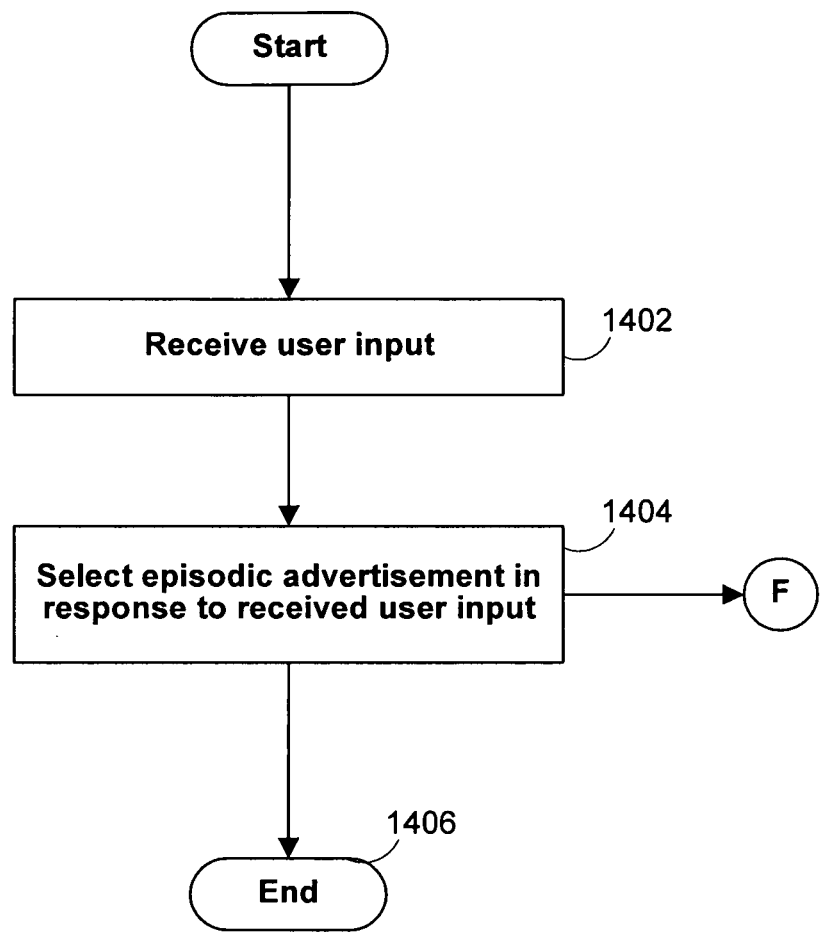
FIG. 14 shows a flow chart of an illustrative process for preventing a user from experiencing an episodic advertisement out of order based on receiving a user input in accordance with one embodiment of the present invention.

FIG. 14 shows a flow chart of an illustrative process 1400 for preventing a user from experiencing an episodic advertisement out of order based on receiving a user input in accordance with one embodiment of the present invention. Process 1400 begins with step 1402. At step 1402, user input is received. The user input may be any input from user input device 114 (FIG. 1). For example, user input may be a channel change, an indication of interest, a recording command, a scroll command, or any other suitable command. The user input may be classified as a source selection command or a guidance application navigation command as discussed with respect to user input device 114 (FIG. 1). Once the user input is received, process 1400 moves to step 1404.

At step 1404, an episodic advertisement is selected in response to the received user input. In one example, a user may enter a channel change command to change channels from a first channel to a second channel. The particular episodic advertisement that the user was watching on the first channel may have been advertising a television show related to that channel, and thus it would be not be appropriate for the user to later view advertisements from that particular episodic advertisement on the second channel. The interactive media guidance application would then select an episodic advertisement meant to be shown on the second channel in place of the episodic advertisement that the user was viewing on the first channel. For example, if a user has been presented an episodic advertisement about tires while watching the racing channel, and then the user changes channels to the fishing channel, he may subsequently be presented with an advertisement related to fishing radar systems, rather than the next advertisement of the tire episodic advertisement. Some episodic advertisements may not be channel specific, for example, an episodic advertisement about a food product such as cereal. In such cases, in some embodiments, the episodic advertisement may be sequenced across channels. In another example, a user may be browsing television listings and viewing a listing for a particular television show. The interactive media guidance application might select an episodic advertisement related to the particular listing instead of an episodic advertisement that the user is watching. In yet another example, a user may execute a command to record a particular television show. The interactive media guidance application may then select an episodic advertisement scheduled to be broadcast during the recorded television show, and allow the user to experience the episodic advertisement instead of an episodic advertisement the user is watching. The process involved in step 1404 will be discussed in further detail in process 1500 (FIG. 5). Once an episodic advertisement has been selected in step 1404, process 1400 ends at step 1406.

Figure 15:
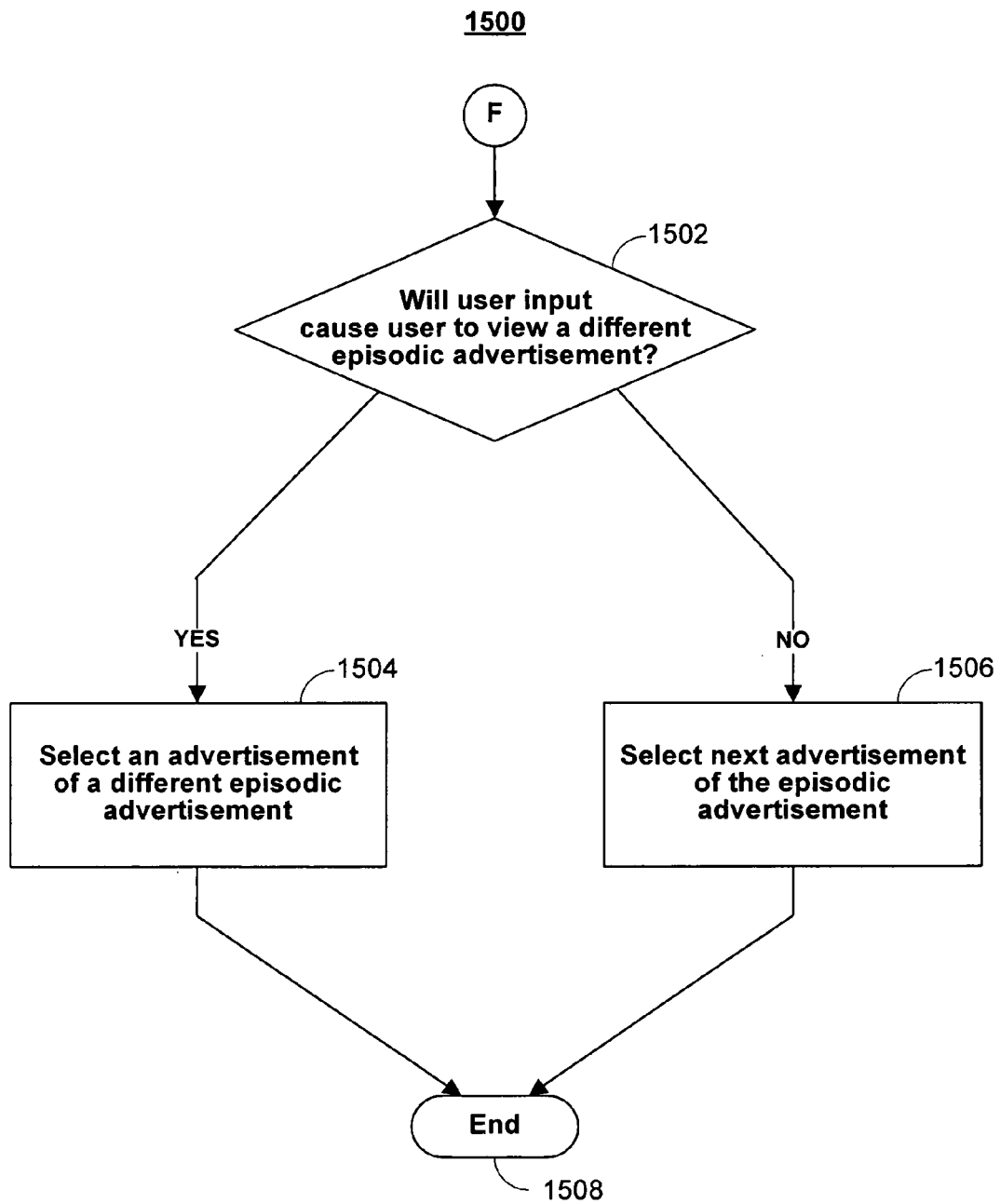
FIG. 15 shows a flow chart of an illustrative process for selecting an episodic advertisement in response to a received user input in accordance with one embodiment of the present invention.

FIG. 15 shows a flow chart of an illustrative process 1500 for selecting an episodic advertisement in response to a received user input in accordance with one embodiment of the present invention. Process 1500 begins at step 1502. At step 1502, it is determined whether the user input will cause a user to view a different episodic advertisement. In one embodiment, this determination may be made using advertisement metadata 300 (FIG. 3) and user viewing data 400 (FIG. 4). In particular, the advertisement metadata of an episodic ad that is displayed after the user input is received may be compared to the advertisement metadata of the last advertisement the user experienced according to the user viewing data. If the unique ID of the displayed advertisement is different from the unique ID of the last advertisement viewed, then the interactive media guidance application knows that the user input has caused the user to view a different episodic advertisement. If the unique IDs of the advertisements match, then the interactive media guidance application knows that the user input has not caused the user to view a different episodic advertisement.

If, at step 1502, it is determined that the user input will cause the user to view a different episodic advertisement, process 1500 executes step 1504. At step 1504, an advertisement from a different episodic advertisement is selected. This advertisement may be selected from the advertisements available on the VOD server 140, user recording device 118, or any other suitable source.

If, at step 1502, it is determined that the user input did not cause the user to view a different episodic advertisement, process 1500 executes step 1506. At step 1506, the next advertisement of the same episodic advertisement is selected. This selection may be substantially similar to that described with respect to step 1302 (FIG. 13).

After an advertisement has been selected in step 1504 or step 1506, process 1500 ends with step 1508. At step 1508, step 1406 (FIG. 14) may be performed, which returns to the end of process 1400.

Figure 16:
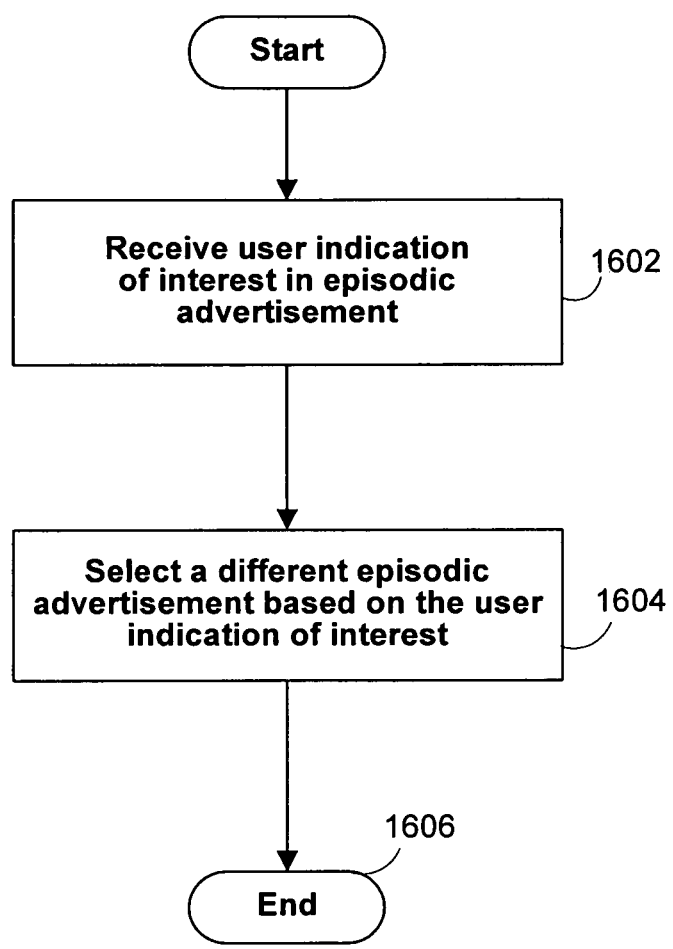
FIG. 16 shows a flow chart of an illustrative process for preventing a user from experiencing an episodic advertisement out of order based on receiving a user indication of interest in accordance with one embodiment of the present invention.

FIG. 16 shows a flow chart of an illustrative process 1600 for preventing a user from experiencing an episodic advertisement out of order based on receiving a user indication of interest in accordance with one embodiment of the present invention. Process 1600 begins at step 1602. At step 1602, a user indication of interest in an episodic advertisement is received. The user indication of interest may be similar to that described with episodic advertisement interest button 740 (FIG. 7). User indications of interest may also include recording programs, viewing listings of programs, or any suitable user indication of interest.

A different episodic advertisement may be selected at step 1604 based on the user indication of interest. In one example, if the user indicated that he is interested in watching a teaser for an upcoming episode of a television show, an episodic advertisement advertising that show may be selected. In another example, if the user records a particular genre of television shows, an episodic advertisement advertising a movie of that same genre may be selected. In yet another example, if a user is viewing listings of television programs for a particular sport, an episodic advertisement for a sporting event relating to that particular sport may be selected. Once an advertisement has been selected, process 1600 ends at step 1606.

Figure 17:
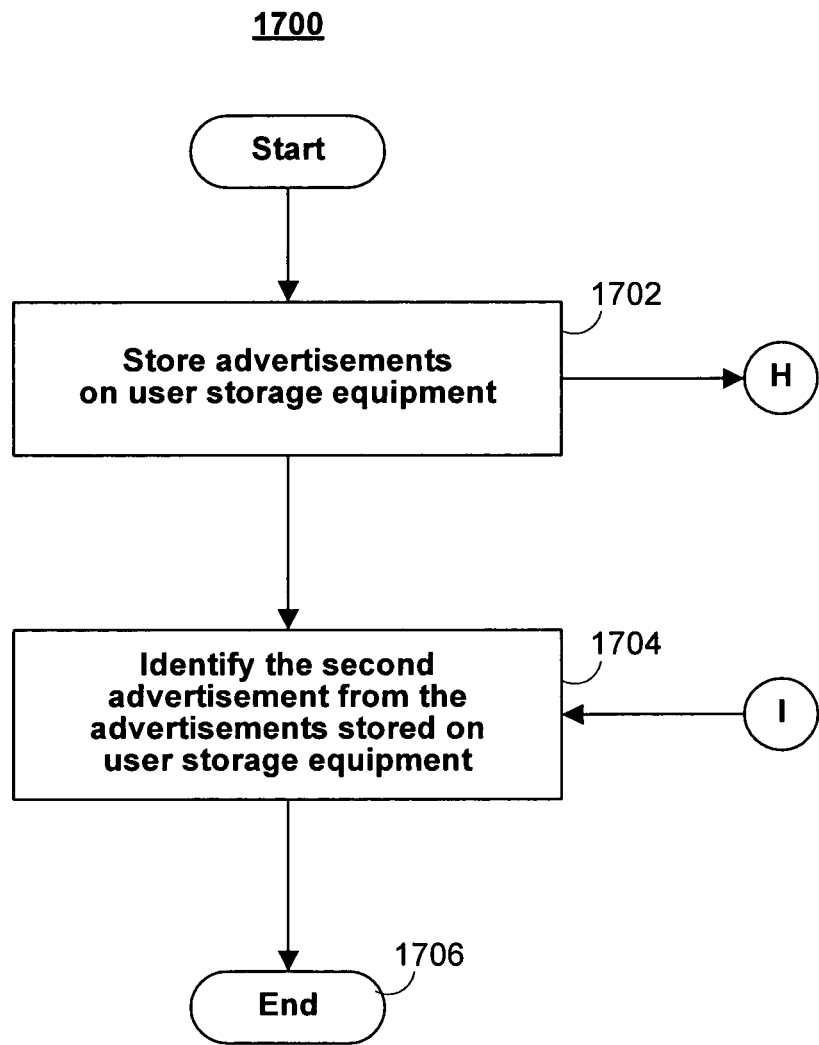
FIG. 17 shows a flow chart of an illustrative process for preventing a user from experiencing an episodic advertisement out of order by storing advertisements on user storage equipment in accordance with one embodiment of the present invention.
Figure 18:
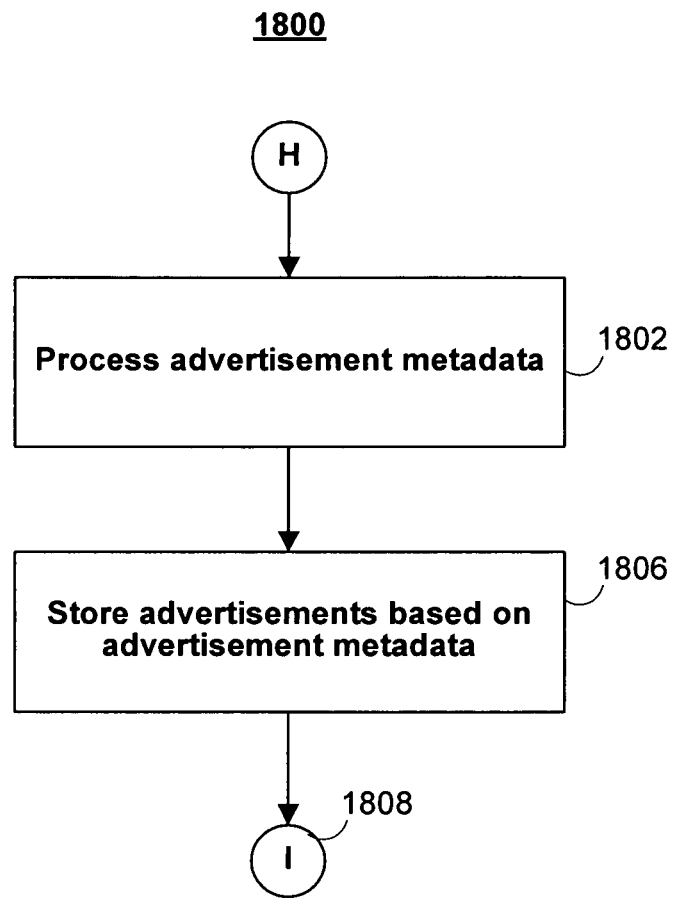
FIG. 18 shows a flow chart of an illustrative process for storing advertisements on user storage equipment in accordance with one embodiment of the present invention.
Figure 19:
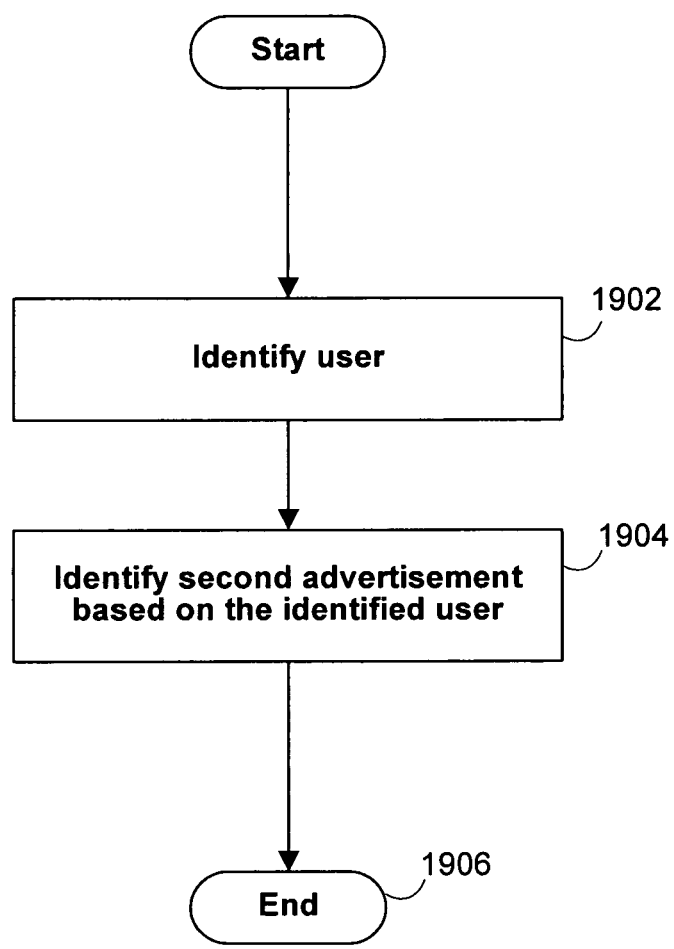
FIG. 19 shows a flow chart of an illustrative process for preventing a user from experiencing an episodic advertisement out of order by identifying the user in accordance with one embodiment of the present invention.

FIG. 17 shows a flow chart of an illustrative process 1700 for preventing a user from experiencing an episodic advertisement out of order by storing advertisements on user storage equipment in accordance with one embodiment of the present invention. Process 1700 begins at step 1702. At step 1702, advertisements are stored on user storage equipment. In one embodiment, the user storage equipment is recording device 118 (FIG. 1). In particular, advertisements may be stored on the user storage equipment based on advertisement metadata 300 (FIG. 3). The process of step 1702 will be described in more detail in process 1800 (FIG. 18). Once advertisements have been stored on the user storage equipment, an advertisement is identified from the stored advertisements at step 1704. This step may be part of step 1004 of process 1000 (FIG. 10), step 1106 of process 1100 (FIG. 11), step 1304 of process 1300 (FIG. 13), step 1404 of process 1400 (FIG. 14), step 1504 of process 1500 (FIG. 15), step 1506 of process 1500, step 1604 of process 1600 (FIG. 16), or step 1904 of process 1900 (FIG. 19). The identified advertisement may then be presented to the user, for example, as part of step 1006 of process 1000 (FIG. 10) or step 1110 of process 1100 (FIG. 11). Process 1700 then ends at step 1706.

FIG. 18 shows a flow chart of an illustrative process 1800 for storing advertisements on user storage equipment in accordance with one embodiment of the present invention. Process 1800 begins at step 1802. At step 1802, advertisement metadata is processed. This step may be performed substantially similar to step 1201 (FIG. 12). Advertisements are stored at step 1806 based on the parsed advertisement metadata. In one embodiment, advertisements are stored based on their unique ID 320 (FIG. 3), i.e. what particular episodic advertisement they are a part of. For example, episodic advertisements advertising sports may be stored, while episodic advertisements advertising television may not be stored. In one embodiment, advertisements may be stored based on their ad expiration field 360 (FIG. 3). For example, only advertisements which have not reached their expiration time may be stored, while advertisements that are past their expiration time may not be stored. On other embodiments, advertisements may be stored based on their sequence ID 330, ad length 340, active advertisement field 350 (FIG. 3), or any other suitable criteria. Once all of the designated advertisements have been stored, process 1800 ends at step 1808, which may execute step 1704 of process 1700 (FIG. 17).

FIG. 19 shows a flow chart of an illustrative process 1900 for preventing a user from experiencing an episodic advertisement out of order by identifying the user in accordance with one embodiment of the present invention. Process 1900 may be performed as part of processes 10-18. Process 1900 begins at step 1902. At step 1902, a user is identified. The user may be identified using information from user input device 114 (FIG. 1). In one embodiment, a user may be identified with a user logon interface displayed in the video region, such as user logon interface 910 (FIG. 9). In other embodiments, users may be identified using any suitable input device coupled with any suitable logon interface. Once a user has been identified, step 1904 is executed. At step 1904, an advertisement is identified based on the identity of the user. This identification may be based on the user viewing data 400 accumulated for the particular user. Once an advertisement is identified, process 1900 ends at step 1906.

The above described embodiments of the present invention are presented for purposes of illustration and not of limitation, and the present invention is limited only by the claims which follow. For example, this invention is described primarily in terms of an interactive media guidance application. However, it may be embodied within any other suitable type of application, such as a trick-play application, a personal video recorder application, a video-on-demand application, a program guide application, or any other suitable application.

What is claimed is:

1. A method for preventing a user from experiencing an episodic advertisement out of order, wherein the episodic advertisement comprises a plurality of advertisements intended to be viewed in an ordered sequence, the method comprising:
    storing information, using control circuitry, that indicates a sequence in which the plurality of advertisements of the episodic advertisement have been viewed, wherein each advertisement of the plurality of advertisements corresponds to a different part of a story that the episodic advertisement tells;
    identifying, based on the stored information, a first position that is next in the ordered sequence relative to the sequence in which the plurality of advertisements have been viewed;
    determining using the control circuitry whether the user is about to experience a first advertisement of the episodic advertisement that is in a second position in the ordered sequence different from the first position;
    selecting using the control circuitry, in response to determining the user is about to experience the first advertisement, a second of the plurality of advertisements of the episodic advertisement that corresponds to the first position; and
    presenting the second advertisement of the episodic advertisement in place of the first advertisement.

2. The method of claim 1, further comprising:
    receiving a user input from an input device; and
    selecting using the control circuitry a different episodic advertisement from a plurality of episodic advertisements in response to the received user input.

3. The method defined in claim 2, wherein the received user input is a source selection command or a guidance application navigation command.

4. The method of claim 1, further comprising accessing a data structure that indicates that the first advertisement has been viewed by the user.

5. The method of claim 1 wherein:
    the method further comprises storing at least one of the plurality of advertisements on user storage equipment; and
    identifying the second advertisement of the episodic advertisement further comprises identifying an advertisement of the at least one of the plurality of advertisements stored on the user storage equipment.

6. The method of claim 1, wherein the method further comprises:
    identifying the user from a plurality of users; and
    identifying the second advertisement of the episodic advertisement based on the identified user.

7. The method of claim 1, further comprising:
    receiving an indication of advertisements experienced by the user; and identifying the second advertisement of the episodic advertisement based on the indication of advertisements experienced by the user.

8. The method of claim 1, further comprising:
receiving a user indicated degree of interest in the episodic advertisement; and
selecting a different episodic advertisement based on the user indicated degree of interest.

9. The method of claim 1, further comprising:
receiving a user indicated degree of interest in the episodic advertisement; and
storing advertisements of a different episodic advertisement sequence based on the user indicated degree of interest.

10. The method of claim 1, further comprising presenting the user with a tickler informing the user of a subsequent advertisement of the episodic advertisement.

11. The method of claim 1, wherein presenting the second advertisement comprises providing the second advertisement from one of a video on demand (VOD) stream, a lookback stream, a startover stream, or switched digital video (SDV) stream.

12. The method of claim 1, wherein the advertisements of the episodic advertisement are video, audio, or graphics.

13. The method of claim 1, further comprising presenting the user with the opportunity to view a desired advertisement from among the advertisements in the episodic advertisement.

14. A system for preventing a user from experiencing an episodic advertisement out of order, wherein the episodic advertisement comprises a plurality of advertisements intended to be viewed in an ordered sequence, comprising a display device and control circuitry, wherein the control circuitry is configured to:
store information that indicates a sequence in which the plurality of advertisements of the episodic advertisement have been viewed, wherein each advertisement of the plurality of advertisements corresponds to a different part of a story that the episodic advertisement tells;
identify, based on the stored information, a first position that is next in the ordered sequence relative to the sequence in which the plurality of advertisements have been viewed;
determine whether the user is about to experience a first advertisement of the episodic advertisement that is in a second position in the ordered sequence different from the first position;
select, in response to determining the user is about to experience the first advertisement, a second of the plurality of advertisements of the episodic advertisement that corresponds to the first position; and
present the second advertisement of the episodic advertisement in place of the first advertisement.

15. The system of claim 14, wherein the control circuitry is further configured to:
receive a user input; and
select a different episodic advertisement from a plurality of episodic advertisements in response to the received user input.

16. The system of claim 15, wherein the received user input is a source selection command or a guidance application navigation command.

17. The system of claim 14, wherein the control circuitry is further configured to access a data structure that indicates that the first advertisement has been viewed by the user the user.

18. The system of claim 14 wherein:
the system further comprises user storage equipment configured to store at least one of the plurality of advertisements; and
the control circuitry is further configured to identify the second advertisement of the episodic advertisement by identifying an advertisement of the at least one of the plurality advertisements stored on the user storage equipment.

19. The system of claim 14, wherein the control circuitry is further configured to:
identify the user from a plurality of users; and
identify the second advertisement of the episodic advertisement based on the identified user.

20. The system of claim 14, wherein the control circuitry is further configured to:
receive an indication of advertisements experienced by the user; and
identify the second advertisement of the episodic advertisement based on the indication of advertisements experienced by the user.

21. The system of claim 14, wherein the control circuitry is further configured to:
receive a user indicated degree of interest in the episodic advertisement; and
select a different episodic advertisement based on the user indicated degree of interest.

22. The system of claim 14, wherein the control circuitry is further configured to:
receive a user indicated degree of interest in the episodic advertisement; and
store advertisements of a different episodic advertisement sequence based on the user indicated degree of interest.

23. The system of claim 14, wherein the control circuitry is further configured to present the user with a tickler informing the user of a subsequent advertisement of the episodic advertisement.

24. The system of claim 14, wherein the control circuitry is further configured to present the second advertisement from one of a video on demand (VOD) stream, a lookback stream, a startover stream, or switched digital video (SDV) stream.

25. The system of claim 14, wherein the advertisements of the episodic advertisement are video, audio, or graphics.

26. The system of claim 14, wherein the control circuitry is further configured to present the user with the opportunity to view a desired advertisement from among the advertisements in the episodic advertisement.

27. A method for minimizing the impact of a user experiencing an episodic advertisement out of order, wherein the episodic advertisement comprises a plurality of advertisements intended to be viewed in an ordered sequence, the method comprising:
storing information, using control circuitry, that indicates a sequence in which the plurality of advertisements of the episodic advertisement have been viewed, wherein each advertisement of the plurality of advertisements corresponds to a different part of a story that the episodic advertisement tells;
identifying, based on the stored information, a first position that is next in the ordered sequence relative to the sequence in which the plurality of advertisements have been viewed;
determining using the control circuitry that the user has experienced a particular advertisement of the episodic advertisement that is in a second position in the ordered sequence different from the first position;

selecting using the control circuitry, in response to said determining, an alternative advertisement of the episodic advertisement to present subsequent to the particular advertisement, wherein the alternative advertisement corresponds to the first position; and presenting using the control circuitry the alternative advertisement of the episodic advertisement.

\* \* \* \* \*

UNITED STATES PATENT AND TRADEMARK OFFICE
CERTIFICATE OF CORRECTION

| | |
|---|---|
| PATENT NO. | : 8,694,396 B1 |
| APPLICATION NO. | : 12/005641 |
| DATED | : April 8, 2014 |
| INVENTOR(S) | : Craner et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this
Twenty-first Day of July, 2015

Michelle K. Lee
*Director of the United States Patent and Trademark Office*